US010311675B2

(12) United States Patent
Arnone et al.

(10) Patent No.: US 10,311,675 B2
(45) Date of Patent: Jun. 4, 2019

(54) LEVEL-BASED MULTIPLE OUTCOME INTERLEAVED WAGERING SYSTEM

(71) Applicant: Gamblit Gaming, LLC, Glendale, CA (US)

(72) Inventors: Miles Arnone, Sherborn, MA (US); Eric Meyerhofer, Pasadena, CA (US); Timothy Isaacson, Monrovia, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 301 days.

(21) Appl. No.: 15/098,287

(22) Filed: Apr. 13, 2016

(65) Prior Publication Data

US 2016/0300449 A1 Oct. 13, 2016

Related U.S. Application Data

(60) Provisional application No. 62/158,807, filed on May 8, 2015, provisional application No. 62/146,706, filed on Apr. 13, 2015.

(51) Int. Cl.
*G06F 17/00* (2019.01)
*G07F 17/32* (2006.01)

(52) U.S. Cl.
CPC ...... *G07F 17/3262* (2013.01); *G07F 17/3244* (2013.01); *G07F 17/3276* (2013.01)

(58) Field of Classification Search
CPC ............. G07F 17/3262; G07F 17/3276; G07F 17/3244
See application file for complete search history.

(56) References Cited

U.S. PATENT DOCUMENTS

| | | | |
|---|---|---|---|
| 5,413,357 | A | 5/1995 | Schulze et al. |
| 5,718,429 | A | 2/1998 | Keller |
| 5,785,592 | A | 7/1998 | Jacobsen |
| 5,853,324 | A | 12/1998 | Kami et al. |
| 5,963,745 | A | 10/1999 | Collins et al. |

(Continued)

OTHER PUBLICATIONS

U.S. Appl. No. 14/205,303 Arnone, et al., filed Mar. 11, 2014.

(Continued)

*Primary Examiner* — Dmitry Suhol
*Assistant Examiner* — Carl V Larsen
(74) *Attorney, Agent, or Firm* — Caitlyn Ross; Frank Cire

(57) ABSTRACT

A level-based multiple outcome wagering system is disclosed. The level-based multiple outcome wagering system includes an interactive controller constructed to control a multilevel wagering session, generate a graphical display of a plurality of actionable elements, wherein the graphical display is a representation of a level of a multilevel wagering proposition presented to a user during the multilevel wagering session, display the graphical display to a user, receive the user's selection of a selected actionable element selected from the plurality of actionable elements, and communicate data of the selected actionable element to a process controller. The process controller is constructed to communicate with the interactive controller and determine from the data of the selected actionable element, a chance outcome selected from the group including a prize awarded to the user, an advancement to a next level of the multilevel wagering proposition, and a termination of the multilevel wagering session.

5 Claims, 14 Drawing Sheets

(56) References Cited

U.S. PATENT DOCUMENTS

| | | | |
|---|---|---|---|
| 6,050,895 | A | 4/2000 | Luciano |
| 6,165,071 | A | 12/2000 | Weiss |
| 6,227,974 | B1 | 5/2001 | Eilat |
| 6,267,669 | B1 | 7/2001 | Luciano |
| 6,685,563 | B1 | 2/2004 | Meekins et al. |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung |
| 7,753,770 | B2 | 7/2010 | Walker et al. |
| 7,753,790 | B2 | 7/2010 | Nguyen |
| 7,766,742 | B2 | 8/2010 | Bennett et al. |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,931,531 | B2 | 4/2011 | Oberberger |
| 7,938,727 | B1 | 5/2011 | Konkle |
| 7,950,993 | B2 | 5/2011 | Oberberger |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,908 | B2 | 11/2011 | Walker |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,142,272 | B2 | 3/2012 | Walker |
| 8,157,653 | B2 | 4/2012 | Buhr |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 8,308,544 | B2 | 11/2012 | Friedman |
| 8,430,735 | B2 | 4/2013 | Oberberger |
| 8,475,266 | B2 | 7/2013 | Amone |
| 8,480,470 | B2 | 7/2013 | Napolitano et al. |
| 8,622,809 | B1 | 1/2014 | Arora et al. |
| 8,864,564 | B2 | 10/2014 | Oberberger |
| 2001/0004609 | A1 | 6/2001 | Walker et al. |
| 2001/0019965 | A1 | 9/2001 | Ochi |
| 2001/0034260 | A1* | 10/2001 | Luciano, Jr. ........ G07F 17/3244 463/16 |
| 2002/0022509 | A1 | 2/2002 | Nicastro et al. |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0097610 | A1 | 5/2004 | Saito |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0233806 | A1 | 10/2005 | Kane et al. |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0035696 | A1 | 2/2006 | Walker |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0223611 | A1 | 10/2006 | Baerlocher |
| 2006/0234791 | A1 | 10/2006 | Nguyen et al. |
| 2006/0240890 | A1 | 10/2006 | Walker |
| 2006/0246403 | A1 | 11/2006 | Monpouet et al. |
| 2006/0258433 | A1 | 11/2006 | Finocchio et al. |
| 2007/0026924 | A1 | 2/2007 | Taylor |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0099696 | A1 | 5/2007 | Nguyen et al. |
| 2007/0117641 | A1 | 5/2007 | Walker et al. |
| 2007/0129149 | A1 | 6/2007 | Walker |
| 2007/0142108 | A1 | 6/2007 | Linard |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0173311 | A1 | 7/2007 | Morrow et al. |
| 2007/0191104 | A1 | 8/2007 | Van Luchene |
| 2007/0202941 | A1 | 8/2007 | Miltenberger |
| 2007/0203828 | A1 | 8/2007 | Jung et al. |
| 2007/0207847 | A1 | 9/2007 | Thomas |
| 2007/0259717 | A1 | 11/2007 | Mattice |
| 2007/0293306 | A1 | 12/2007 | Nee et al. |
| 2008/0004107 | A1 | 1/2008 | Nguyen et al. |
| 2008/0014835 | A1 | 1/2008 | Neston et al. |
| 2008/0015004 | A1 | 1/2008 | Gatto et al. |
| 2008/0064488 | A1 | 3/2008 | Oh |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108406 | A1 | 5/2008 | Oberberger |
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0146308 | A1 | 6/2008 | Okada |
| 2008/0161081 | A1 | 7/2008 | Berman |
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274796 | A1 | 11/2008 | Lube |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |
| 2009/0061975 | A1 | 3/2009 | Ditchev |
| 2009/0061991 | A1 | 3/2009 | Popovich |
| 2009/0061997 | A1 | 3/2009 | Popovich |
| 2009/0061998 | A1 | 3/2009 | Popovich |
| 2009/0061999 | A1 | 3/2009 | Popovich |
| 2009/0082093 | A1 | 3/2009 | Okada |
| 2009/0088239 | A1 | 4/2009 | Iddings |
| 2009/0098934 | A1 | 4/2009 | Amour |

(56) References Cited

U.S. PATENT DOCUMENTS

| | | | |
|---|---|---|---|
| 2009/0118006 A1 | 5/2009 | Kelly et al. | |
| 2009/0124344 A1 | 5/2009 | Mitchell et al. | |
| 2009/0131158 A1 | 5/2009 | Brunet De Courssou et al. | |
| 2009/0131175 A1 | 5/2009 | Kelly et al. | |
| 2009/0143141 A1 | 6/2009 | Wells | |
| 2009/0149233 A1 | 6/2009 | Strause et al. | |
| 2009/0156297 A1 | 6/2009 | Andersson et al. | |
| 2009/0176560 A1 | 7/2009 | Herrmann et al. | |
| 2009/0176566 A1 | 7/2009 | Kelly | |
| 2009/0181777 A1 | 7/2009 | Christiani | |
| 2009/0221355 A1 | 9/2009 | Dunaevsky et al. | |
| 2009/0239610 A1 | 9/2009 | Olive | |
| 2009/0247272 A1 | 10/2009 | Abe | |
| 2009/0270164 A1 | 10/2009 | Seelig | |
| 2009/0275393 A1 | 11/2009 | Kisenwether | |
| 2009/0291755 A1 | 11/2009 | Walker et al. | |
| 2009/0309305 A1 | 12/2009 | May | |
| 2009/0312093 A1 | 12/2009 | Walker et al. | |
| 2009/0325686 A1 | 12/2009 | Davis | |
| 2010/0004058 A1 | 1/2010 | Acres | |
| 2010/0016056 A1 | 1/2010 | Thomas et al. | |
| 2010/0029373 A1 | 2/2010 | Graham et al. | |
| 2010/0035674 A1 | 2/2010 | Slomiany | |
| 2010/0056247 A1 | 3/2010 | Nicely | |
| 2010/0056260 A1 | 3/2010 | Fujimoto | |
| 2010/0062836 A1 | 3/2010 | Young | |
| 2010/0093420 A1 | 4/2010 | Wright | |
| 2010/0093444 A1 | 4/2010 | Biggar et al. | |
| 2010/0105454 A1 | 4/2010 | Weber | |
| 2010/0120525 A1 | 5/2010 | Baerlocher et al. | |
| 2010/0124983 A1 | 5/2010 | Gowin et al. | |
| 2010/0137047 A1 | 6/2010 | Englman et al. | |
| 2010/0174593 A1 | 7/2010 | Cao | |
| 2010/0184509 A1 | 7/2010 | Sylla et al. | |
| 2010/0203940 A1 | 8/2010 | Alderucci et al. | |
| 2010/0210344 A1 | 8/2010 | Edidin et al. | |
| 2010/0227672 A1 | 9/2010 | Amour | |
| 2010/0227688 A1 | 9/2010 | Lee | |
| 2010/0240436 A1 | 9/2010 | Wilson et al. | |
| 2010/0304825 A1 | 12/2010 | Davis | |
| 2010/0304839 A1 | 12/2010 | Johnson | |
| 2010/0304842 A1 | 12/2010 | Friedman et al. | |
| 2011/0009177 A1 | 1/2011 | Katz | |
| 2011/0009178 A1 | 1/2011 | Gerson | |
| 2011/0045896 A1 | 2/2011 | Sak et al. | |
| 2011/0077087 A1 | 3/2011 | Walker et al. | |
| 2011/0082571 A1 | 4/2011 | Murdock et al. | |
| 2011/0086693 A1* | 4/2011 | Guziel | G07F 17/32 463/17 |
| 2011/0105206 A1 | 5/2011 | Rowe et al. | |
| 2011/0107239 A1 | 5/2011 | Adoni | |
| 2011/0109454 A1 | 5/2011 | McSheffrey | |
| 2011/0111820 A1 | 5/2011 | Filipour | |
| 2011/0111837 A1 | 5/2011 | Gagner | |
| 2011/0111841 A1 | 5/2011 | Tessmer | |
| 2011/0118011 A1 | 5/2011 | Filipour et al. | |
| 2011/0201413 A1 | 8/2011 | Oberberger | |
| 2011/0207523 A1 | 8/2011 | Filipour et al. | |
| 2011/0212766 A1 | 9/2011 | Bowers | |
| 2011/0212767 A1 | 9/2011 | Barclay | |
| 2011/0218028 A1 | 9/2011 | Acres | |
| 2011/0218035 A1 | 9/2011 | Thomas | |
| 2011/0230258 A1 | 9/2011 | Van Luchene | |
| 2011/0230260 A1 | 9/2011 | Morrow et al. | |
| 2011/0230267 A1 | 9/2011 | Van Luchene | |
| 2011/0244944 A1 | 10/2011 | Baerlocher | |
| 2011/0263312 A1 | 10/2011 | De Waal | |
| 2011/0269522 A1 | 11/2011 | Nicely et al. | |
| 2011/0275440 A1 | 11/2011 | Faktor | |
| 2011/0287828 A1 | 11/2011 | Anderson et al. | |
| 2011/0287841 A1 | 11/2011 | Watanabe | |
| 2011/0312408 A1 | 12/2011 | Okuaki | |
| 2011/0319169 A1 | 12/2011 | Lam | |
| 2012/0004747 A1 | 1/2012 | Kelly | |
| 2012/0028718 A1 | 2/2012 | Barclay et al. | |
| 2012/0058814 A1 | 3/2012 | Lutnick | |
| 2012/0077569 A1 | 3/2012 | Watkins | |
| 2012/0108323 A1 | 5/2012 | Kelly | |
| 2012/0135793 A1 | 5/2012 | Antonopoulos | |
| 2012/0202587 A1 | 8/2012 | Allen | |
| 2012/0302311 A1 | 11/2012 | Luciano | |
| 2012/0322545 A1 | 12/2012 | Arnone et al. | |
| 2013/0029760 A1 | 1/2013 | Wickett | |
| 2013/0131848 A1 | 5/2013 | Arnone et al. | |
| 2013/0190074 A1 | 7/2013 | Arnone et al. | |
| 2013/0260869 A1 | 10/2013 | Leandro et al. | |
| 2014/0087801 A1 | 3/2014 | Nicely et al. | |
| 2014/0087808 A1 | 3/2014 | Leandro et al. | |
| 2014/0087809 A1 | 3/2014 | Leupp et al. | |
| 2014/0357350 A1 | 12/2014 | Weingardt et al. | |

OTHER PUBLICATIONS

U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.

(56) References Cited

OTHER PUBLICATIONS

U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/060,502 Arnone, et al. filed Mar. 3, 2016.
U.S. Appl. No. 15/063,365 Arnone, et al. filed Mar. 7, 2016.
U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.

* cited by examiner

1100

1300

1400

LEVEL-BASED MULTIPLE OUTCOME INTERLEAVED WAGERING SYSTEM

CROSS REFERENCE TO RELATED APPLICATIONS

This application claims the benefit of U.S. Provisional Patent Application No. 62/146,706, filed Apr. 13, 2015, and U.S. Provisional Patent Application No. 62/158,807, filed May 8, 2015, the disclosures of each of which are incorporated by reference herein in their entirety.

FIELD OF THE INVENTION

Embodiments of the invention are generally related to communications within data processing systems. More particularly, the invention relates to the communication and processing of wagering data.

BACKGROUND

The gaming industry has traditionally developed electronic gaming machines (EGMs) that implement simple wagers. However, more complicated wagering processes need communication and processing systems that are better suited for implementing these more complicated wagering processes. Various aspects of embodiments of the invention meet such a need.

SUMMARY OF THE INVENTION

Systems and methods in accordance with embodiments of the invention provide a communication and data processing system constructed for a level-based multiple outcome wagering system.

In an embodiment, a level-based multiple outcome wagering system is provided. The level-based multiple outcome wagering system includes an interactive controller constructed to: control a multilevel wagering session; generate a graphical display of a plurality of actionable elements, wherein the graphical display is a representation of a level of a multilevel wagering proposition presented to a user during the multilevel wagering session; display the graphical display to a user; receive the user's selection of a selected actionable element selected from the plurality of actionable elements; and communicate data of the selected actionable element to a process controller. The process controller is constructed to: communicate with the interactive controller; and determine from the data of the selected actionable element, a chance outcome selected from the group including a prize awarded to the user, an advancement to a next level of the multilevel wagering proposition, and a termination of the multilevel wagering session.

In another embodiment, the interactive controller and the process controller are constructed from the same device.

In yet another embodiment, the process controller is operatively connected to the interactive controller using a communication link.

In some embodiments, the level-based multiple outcome wagering system further includes an enclosure constructed to mount: a user input device operatively connected to the interactive controller; a user output device operatively connected to the interactive controller; a credit input device operatively connected to the process controller; and a credit output device operatively connected to the process controller In various embodiments, the level-based multiple outcome wagering system further includes a random number generator, wherein the process controller is further constructed to: communicate with the credit input device to receive a credit input, the credit input for wagering in the multilevel wagering proposition; generate a chance-based component of the multilevel wagering proposition based on a random result generated by the random number generator; determine the multilevel wagering proposition based on the chance-based component; communicate the multilevel wagering proposition to the interactive controller; and update a credit meter based on a determination from the data of the selected actionable element to award to the user of a chance outcome that is a prize.

In an embodiment of the invention, a process controller operates as an interface between an interactive controller that determines skill outcomes and a wagering sub-controller that determines chance-based components. By virtue of this feature, the wagering sub-controller is isolated from the interactive controller allowing the interactive controller to operate in an unregulated environment while allowing the wagering sub-controller to operate in a regulated environment, thus providing for more efficient management of the operations of such a system.

In another embodiment of the invention, a single wagering sub-controller may provide services to two or more interactive controllers, thus allowing a level-based multiple outcome wagering system to operate more efficiently over a large range of scaling.

In another embodiment of the invention, multiple types of interactive controllers using different operating systems may be interfaced to a single type of process controller without requiring customization of the process controller and/or the wagering sub-controller, thus improving the efficiency of the process controller and/or the wagering sub-controller by reducing complexity associated with maintaining separate process controllers and/or wagering sub-controllers for each type of interactive controller.

In another embodiment of the invention, an interactive controller may be provided as a user device under control of a user while maintaining the process controller in an environment under the control of a regulated operator of wagering equipment, thus providing for a more economical system as the regulated operator need not expend capital to purchase interactive controllers.

In another embodiment of the invention, data communicated between the controllers may be encrypted to increase security of the level-based multiple outcome wagering system.

In another embodiment of the invention, a process controller isolates chance-based component logic and skill proposition logic as unregulated logic from a regulated wagering sub-controller, thus allowing errors in the skill proposition logic and/or chance-based component logic to be corrected, new skill proposition logic and/or chance-based component logic to be used, or modifications to be made to the skill proposition logic and/or chance-based component logic without a need for time-consuming regulatory approval.

In another embodiment of the invention, an interactive application may require extensive processing resources from an interactive controller leaving few processing resources for the functions performed by a process controller and/or a wagering sub-controller. By virtue of an architecture of some embodiments of the invention, processing loads may be distributed across multiple devices such that operations of the interactive controller may be dedicated to an interactive application and the processes of the process controller and/or wagering sub-controller are not burdened by the requirements of the interactive application.

In another embodiment of the invention, a level-based multiple outcome wagering system operates with its components being distributed across multiple devices. These devices can be connected by communication channels including, but not limited to, local area networks, wide area networks, local communication buses, and/or the like. The devices may communicate using various types of protocols, including but not limited to, networking protocols, device-to-device communications protocols, and the like. In many such embodiments, one or more components of a level-based multiple outcome wagering system are distributed in close proximity to each other and communicate using a local area network and/or a communication bus. In several embodiments, an interactive controller and a process controller of a level-based multiple outcome wagering system are in a common location. In some embodiments, a process controller communicates with an external interactive controller. In various embodiments, these multiple controllers and sub-controllers can be constructed from or configured using a single device or a plurality of devices such that a level-based multiple outcome wagering system is executed as a system in a virtualized space such as, but not limited to, where a wagering sub-controller and a process controller are large scale centralized servers and are operatively connected to distributed interactive controllers via a wide area network such as the Internet or a local area network. In such embodiments, the components of a level-based multiple outcome wagering system may communicate using a networking protocol or other type of device-to-device communications protocol.

In another embodiment of the invention, an interactive controller is an interactive server acting as a host for managing head-to-head user interactions over a network of interactive sub-controllers connected to the interactive server using a communication link. The interactive server provides an environment where users can compete directly with one another and interact with other users.

DETAILED DESCRIPTION

Figure 1:
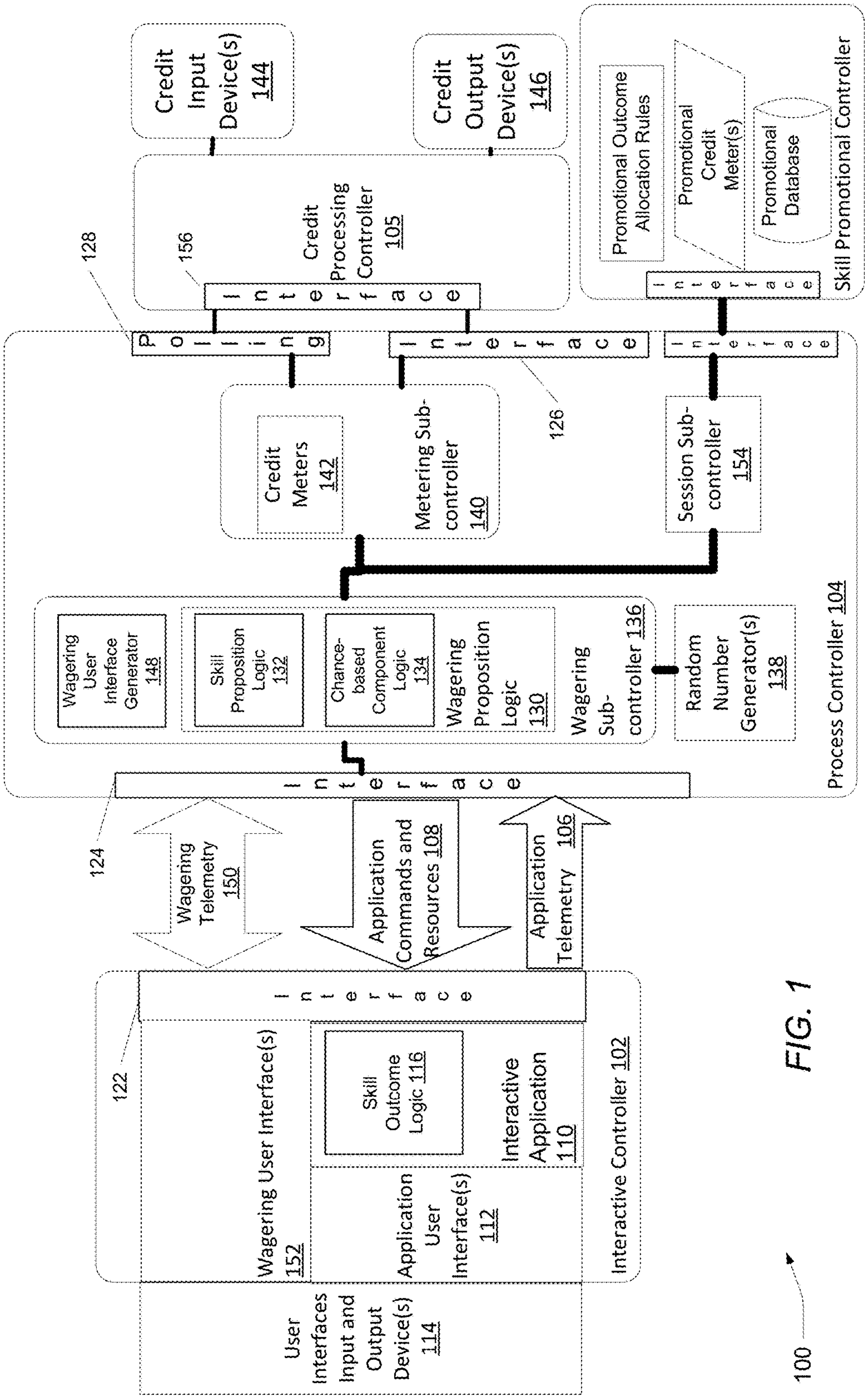
FIG. 1 is a diagram of a structure of a level-based multiple outcome wagering system in accordance with various embodiments of the invention.

A level-based multiple outcome wagering system allows for the management of a multilevel wagering proposition having a skill proposition for one or more users where the skill proposition has one or more chance-based components generated in accordance with a chance proposition. In some embodiments of a level-based multiple outcome wagering system, an interactive application executed by an interactive controller provides skill proposition components of the level-based multiple outcome wagering system. The interactive controller is operatively connected to a process controller that manages and configures the interactive controller and the interactive application, and determines skill propositions having chance-based components determined by a wagering sub-controller that are resolved as skill outcomes determined by the interactive application.

In some embodiments, the interactive controller also provides a wagering user interface that is used to receive commands and display data for a wagering process and wagering outcome determined from the skill outcome in accordance with a multilevel wagering proposition. The content of the wagering user interface is controlled by the process controller and includes content provided by the wagering sub-controller and the interactive controller.

In various embodiments, an interactive controller provides a management user interface used to manage a user profile.

Many different types of interactive applications may be utilized with the level-based multiple outcome wagering system. In some embodiments, the interactive application reacts to the physical activity of a user. In these embodiments, the interactive application senses user interactions with the interactive application through one or more sensors that monitor the user's physical activities. Such sensors may include, but are not limited to, physiological sensors that monitor the physiology of the user, environmental sensors that monitor the physical environment of the interactive controller, accelerometers that monitor changes in motion of the interactive controller, and location sensors that monitor the location of the interactive controller such as global positioning sensors.

In some embodiments, the interactive application implements a skill-based game and interacts with the user by sensing skillful interactions with an interactive user interface generated by the interactive application.

In many embodiments, the interactive application generates various types of interactive elements in an interactive application environment. In some embodiments, these interactive elements are interactive application resources utilized within the interactive application environment to provide an interactive experience for a user.

In accordance with some embodiments, a chance-based component of the skill proposition can influence interactive elements in the interactive application environment such as, but not limited to, automatically providing one or more new interactive elements, automatically restoring one or more consumed interactive elements, automatically causing the loss of one or more interactive elements, and automatic restoration or placement of one or more fixed interactive elements.

In various embodiments, the wagers may be made using one or more credits.

In some embodiments, credits can be one or more credits that are purchased using, and redeemed in, a real world currency having a real world value.

In many embodiments, credits can be one or more credits in a virtual currency. Virtual currency is an alternate currency that can be acquired, purchased or transferred by or to a user, but does not necessarily directly correlate to a real world currency. In many such embodiments, credits in a virtual currency are allowed to be purchased using a real world currency but are prevented from being redeemed in a real world currency having a real world value.

In several embodiments, interaction with the interactive elements of the interactive application, application credits can be optionally consumed and/or accrued within the interactive application as a result of interaction with the interactive elements. Application credits can be in the form of, but not limited to, application environment credits, experience points, and points generally.

In various embodiments, application credits are awarded on the basis of skillful interactions with the interactive elements of a skill-based interactive application. The skill-based interactive application can have one or more scoring criteria, embedded within a process controller and/or an interactive controller that provides the skill-based interactive application, that can be used to determine user performance against one or more goals of the skill-based interactive application in accordance with a skill proposition.

In many embodiments, application credits can be used to purchase in-application items, including but not limited to, application interactive elements that have particular properties, power ups for existing items, and other item enhancements.

In some embodiments, application credits may be used to earn entrance into a sweepstakes drawing, to earn entrance in a tournament with prizes, to score in the tournament, and/or to participate and/or score in any other game event.

In several embodiments, application credits can be stored on a user-tracking card, voucher or in a network-based user tracking system where the application credits are attributed to a specific user.

In many embodiments, a multilevel wagering proposition includes a wager of application credits for payout of application credits, interactive application elements, and/or interactive application objects in accordance with the chance-based proposition.

In a number of embodiments, a wager of an amount of credits results in a payout of application credits, interactive elements, and/or interactive application objects that have a credit value if cashed out.

In some embodiments, interactive application objects include in-application objects that may be utilized to enhance user interactions with the interactive application. Such objects include, but are not limited to, power-ups, enhanced in-application items, and the like. In some embodiments, the interactive application objects include objects that are detrimental to user interactions with the interactive application such as, but not limited to, obstructions in the interactive application space, a temporary handicap, an enhanced opponent, and the like.

In numerous embodiments, an interactive application command is an instruction by a process controller to an interactive controller and/or an interactive application of the interactive controller to modify a state of an interactive application or modify one or more interactive application resources or interactive elements. In some embodiments, the interactive application commands may be automatically generated by the process controller using one or more of a chance-based component and/or application environment variables. An interactive application command can be used by a process controller control many processes of an interactive application, such as, but not limited to, an causing an addition of a period of time available for a current interactive application session for the interactive application, an addition of a period of time available for a future level-based multiple outcome wagering system interactive application session or any other modification to the interactive application interactive elements that can be utilized during an interactive application session.

In some embodiments, asynchronous communications provided for by a level-based multiple outcome wagering system may reduce an amount of idle waiting time by an interactive controller of the level-based multiple outcome wagering system, thus increasing an amount of processing resources that the interactive controller may provide to an interactive application or other processes of the interactive controller. In many embodiments, asynchronous communications provided for by a level-based multiple outcome wagering system reduces an amount of idle waiting time by a process controller, thus increasing an amount of processing resources that the process controller may provide to determine chance-based components, and other processes provided by the process controller.

In some embodiments, a wagering sub-controller of a level-based multiple outcome wagering system may be operatively connected to a plurality of interactive controllers through a process controller and the asynchronous communications provided for by the process controllers allows the wagering sub-controller to operate more efficiently by providing chance outcomes to a larger number of interactive controllers than would be achievable without the process controller of the level-based multiple outcome wagering system.

In some embodiments, a level-based multiple outcome wagering system including a process controller operatively connected to a wagering sub-controller and operatively connected to an interactive controller wherein the process controller provides for simplified communication protocols for communications of the interactive controller as the interactive controller may communicate interactions with an interactive application provided by the interactive controller to the process controller without regard to a nature of a chance-based proposition.

In various embodiments, a level-based multiple outcome wagering system including a process controller operatively connected to a wagering sub-controller and operatively connected to an interactive controller may provide for simplified communication protocols for communications of the wagering sub-controller as the wagering sub-controller may receive skill proposition requests and communicate determined skill propositions having chance-based components without regard to a nature of an interactive application provided by the interactive controller.

In some embodiments, a level-based multiple outcome wagering system including a process controller operatively connecting a wagering sub-controller to an interactive controller may provide for reduced processing requirement for the interactive controller by offloading the execution of a random number generator from the interactive controller to the process controller. In various such embodiments, additional processing resources may be made available to graphics processing or other processing intensive operations by the interactive controller because of the offloaded random number processing.

In various embodiments, a level-based multiple outcome wagering system including a process controller operatively connecting a wagering sub-controller to an interactive controller provides for operation of the interactive controller in an unsecure location or manner, while providing for operation of the wagering sub-controller in a secure location or manner.

In some embodiments, a level-based multiple outcome wagering system including a process controller operatively connecting a wagering sub-controller to an interactive controller allows the skill wagering system to have regulated components coupled to unregulated components in a heterogeneous regulated environment. For example, in several such embodiments, the interactive controller may be a device that is not regulated by a wagering regulatory agency whereas the wagering sub-controller is regulated by the wagering regulatory agency. A process controller of a level-based multiple outcome wagering system may provide for isolation of the processing of the interactive controller from the processing of the wagering sub-controller. In such a heterogeneous regulatory environment, the process controller may or may not be itself a regulated by the wagering regulatory authority. In addition, components of an interactive application executed by the interactive controller may be either regulated or unregulated by the wagering regulatory agency.

FIG. 1 is a diagram of a structure of a level-based multiple outcome wagering system in accordance with various embodiments of the invention. The level-based multiple outcome wagering system 100 includes an interactive controller 102, a process controller 104, and a credit processing controller 105. The interactive controller 102 is operatively connected to, and communicates with, the process controller 104. The process controller 104 is also operatively connected to, and communicates with, the credit processing controller 105.

<Interactive Controller>

In various embodiments, the interactive controller 102 executes an interactive application 110 and provides one or more user interface input and output devices 114 so that one or more users can interact with the interactive application 110. In various embodiments, user interface input devices include, but are not limited to: buttons or keys; keyboards; keypads; game controllers; joysticks; computer mice; track balls; track buttons; touch pads; touch screens; accelerometers; motion sensors; video input devices; microphones; and the like. In various embodiments, user interface output devices include, but are not limited to: audio output devices such as speakers, headphones, earbuds, and the like; visual output devices such as lights, video displays and the like; and tactile devices such as rumble pads, hepatic touch screens, buttons, keys and the like. The interactive controller 102 provides for user interactions with the interactive application 110 by executing the interactive application 110 that generates an application user interface 112 that utilizes the user interface input devices to detect user interactions with the interactive controller 102 and generates an interactive user interface that is presented to the user utilizing the user interface output devices.

In some embodiments, one or more components an interactive controller are housed in an enclosure such as a housing, cabinet, casing or the like. The enclosure further includes one or more user accessible openings or surfaces that constructed to mount the user interface input devices and/or the user interface output devices.

The interactive controller 102 is operatively connected to, and communicates with, the process controller 104. The interactive controller 102 receives application command and resource data 108 including skill proposition data, application command data, and resource data, from the process controller 104. Via the communication of the application command and resource data 108, the process controller 104 can control the operation of the interactive controller 102 by communicating control parameters to the interactive application 110 during the interactive application's execution by the interactive controller 102.

In some embodiments, during execution of the interactive application 110 by the interactive controller 102, the interactive controller 102 communicates, as application telemetry data 106, user interactions with one or more interactive elements of the application user interfaces 112 of the interactive application to the process controller 104. the application telemetry data 106 may include, but is not limited to, application environment variables that indicate the state of the interactive application 110, interactive controller data indicating a state of the interactive controller 102, user actions and interactions between one or more users and the interactive application 110 provided by the interactive controller 102, and utilization of interactive elements in the interactive application 110 by one or more users.

In some embodiments, the application telemetry 106 includes a skill outcome as determined by the interactive application 110 using skill outcome logic 116, the application command and resource data 108, and user interactions with one or more application user interfaces 112 of the interactive application.

In some embodiments, the interactive application 110 is a skill-based interactive application. In such embodiments, execution of the skill-based interactive application 110 by the interactive controller 102 is based on one or more users' skillful interaction with the interactive application 110, such as, but not limited to, the users' utilization of the interactive elements of the interactive application during the users' skillful interaction with the skill-based interactive application. In such an embodiment, the process controller 104 communicates with the interactive controller 102 in order to allow the coupling of the skill-based interactive application to chance-based components determined in accordance with a chance-based proposition of the wagering sub-controller 136.

In some embodiments, the interactive application 110 uses skill proposition data, interactive application command data, and/or resource data included in the application commands and resources 108 to generate a skill proposition presented to one or more users as one or more application user interfaces 112 using one or more output devices of user interface and output device(s) 114. The one or more users skillfully interact with the one or more application user interfaces 112 using one or more of input devices of the user interface input and output devices 114. The interactive application 110 determines a skill outcome based on the skillful interactions of the one or more users and communicates data of the determined skill outcome to the process controller 104 as part of the application telemetry 106. In some embodiments, the interactive application 110 also communicates as part of the application telemetry data 106, data encoding the one or more users' interactions with the interactive application 110.

In some embodiments, the skill outcome logic 116 and the skill proposition data included in the application commands and resources 108 are for a skill proposition for one or more users. The interactive application 110 determines skill outcomes based on the skill proposition and the one or more users' skillful interactions with the interactive application. The skill outcomes are communicated by the interactive controller 102 to the process controller 104 included in the application telemetry 106.

In some embodiments, the interactive controller 102 includes one or more sensors that sense various aspects of the physical environment of the interactive controller 102. Examples of sensors include, but are not limited to: global positioning sensors (GPSs) for sensing communications from a GPS system to determine a position or location of the interactive controller; temperature sensors; accelerometers; pressure sensors; and the like. Sensor telemetry data is communicated by the interactive controller to the process controller 104 as part of the application telemetry data 106. The process controller 104 receives the sensor telemetry data and uses the sensor telemetry data to make wagering decisions.

In many embodiments, the interactive controller 102 includes one or more wagering user interfaces 118 used to display wagering data, via one or more of the user interface input and output devices 114, to one or more users.

In various embodiments, an application control interface 122 resident in the interactive controller 102 provides an interface between the interactive controller 102 and the process controller 104.

In some embodiments, the application control interface 122 implements an interactive controller to process controller communication protocol employing an interprocess communication protocol so that the interactive controller and the process controller may be implemented on the same device. In operation, the application control interface 122 provides application programming interfaces that are used by the interactive application 110 of the interactive controller 102 to communicate outgoing data and receive incoming data by passing parameter data to another process or application.

In some embodiments, the application control interface 122 implements an interactive controller to process controller communication protocol employing an interdevice communication protocol so that the interactive controller and the process controller may be implemented on different devices. The interdevice protocol may utilize a wired communication bus or wireless connection as a physical layer.

In various embodiments, the application control interface 122 implements an interactive controller to process controller communication protocol employing a networking protocol so that the interactive controller and the process controller may be implemented on different devices connected by a network. The networking protocol may utilize a wired communication bus or wireless connection as a physical layer. In many such embodiments, the network includes a cellular telephone network or the like and the interactive controller is a mobile device such as a smartphone or other device capable of using the telephone network. During operation, the application control interface 122 communicates outgoing data to an external device by encoding the data into a signal and transmitting the signal to an external device. The application control interface receives incoming data from an external device by receiving a signal transmitted by the external device and decoding the signal to obtain the incoming data.

<Process Controller>

The process controller 104 provides an interface between a skill propositison resolved for one or more users when skillfully interacting with the interactive application 110 provided by the interactive controller 102, and a chance-based component, provided in-part by a wagering sub-controller 136.

In various embodiments, the process controller 104 includes a wagering sub-controller 136 having a rule-based decision engine that receives application telemetry data 106 from the interactive controller 102. The rule-based decision engine has multilevel wagering proposition logic 130 including skill proposition logic 132 and chance-based component logic 134. The decision engine uses the application telemetry data 106, along with chance-based component logic 134, and a random outcome generated by one or more random number generators (RNGs) 138 to generate a chance-based component of a skill proposition.

In an embodiment, the application telemetry data 106 used by the decision engine encodes data about the operation of the interactive application 110 executed by the interactive controller 102.

In some embodiments, the application telemetry data 106 encodes interactions of a user, such as a user's interaction with an interactive element of the interactive application 110.

In many embodiments, the application telemetry data 106 includes a state of the interactive application 110, such as values of variables that change as the interactive application 110 executes.

In several embodiments, the decision engine includes one or more rules as part of chance-based component logic 134 used by the decision engine 122 to determine how a chance-based component should generated. Each rule includes one or more variable values constituting a pattern that is to be matched by the wagering sub-controller 136 using the decision engine to one or more variable values encoded in the application telemetry data 106. Each rule also includes one or more actions that are to be taken if the pattern is matched. Actions can include automatically generating the chance-based component in accordance with the chance-based component logic 134 and a random outcome generated by one or more random number generators 138. During operation, the decision engine receives application telemetry data 106 from the interactive controller 102 via interface 160. The decision engine performs a matching process of matching the variable values encoded in the application telemetry data 106 to one or more variable patterns of one or more rules. If a match between the variable values and a pattern of a rule is determined, then the wagering controller 104 performs the action of the matched rule.

In some embodiments, the wagering sub-controller 136 uses the chance-based component in conjunction with the application telemetry data 106 and skill proposition logic 132, to automatically generate application command and resource data 108 including skill proposition data of a skill proposition that the process controller 104 communicates to the interactive controller 102 via interfaces 124 and 122.

In some embodiments, the decision engine includes one or more rules as part of skill proposition logic 132 used by the decision engine to automatically generate the application command and resource data 108 that is then communicated to the interactive controller 102. Each rule includes one or more variable values constituting a pattern that is to be matched to one or more variable values encoded in the application telemetry data 106 and the chance-based component. Each rule also includes one or more actions that are to be automatically taken by the wagering sub-controller 136 if the pattern is matched. Actions can include automatically generating skill proposition data, interactive application command data, and/or resource data 108 and using the skill proposition data, interactive application command data, and/or resource data 108 to control the interactive controller 102 to affect execution of the interactive application 110 as described herein. In operation, wagering sub-controller 104 uses the decision engine 122 to match the variable values encoded in the in the chance-based component data to one or more patterns of one or more rules of the skill proposition logic 132. If a match between the variable values and a pattern of a rule is found, then the process controller automatically performs the action of the matched rule. In some embodiments, the process controller 104 uses the application telemetry data 106 received from the interactive controller 102 in conjunction with the chance-based component to generate the skill proposition data, interactive application command data, and/or resource data 108.

The interactive controller receives the skill proposition data, interactive application command data, and resource data 108 and automatically uses the skill proposition data, interactive application command data, and/or resource data 108 to configure and command the processes of the interactive application 110.

In some embodiments, the interactive application 110 operates utilizing a scripting language. The interactive application 110 parses scripts written in the scripting language and executes commands encoded in the scripts and sets variable values as defined in the scripts. In operation of such embodiments, the process controller 104 automatically generates skill proposition data, interactive application command data, and/or resource data 108 in the form of scripts written in the scripting language that are communicated to the interactive controller 102 during execution of the interactive application 110. The interactive controller 102 receives the scripts and passes them to the interactive application 110. The interactive application 110 receives the scripts, parses the scripts and automatically executes the commands and sets the variable values as encoded in the scripts.

In many embodiments, the interactive application 110 automatically performs processes as instructed by commands communicated from the process controller 104. The commands command the interactive application 110 to perform specified operations such as executing specified commands and/or setting the values of variables utilized by the interactive application 110. In operation of such embodiments, the process controller 104 automatically generates commands that are encoded into the skill proposition data, interactive application command data, and/or resource data 108 that are communicated to the interactive controller 102. The interactive controller 102 passes the skill proposition data, interactive application command data, and/or resource data 108 to the interactive application 110. The interactive application parses the skill proposition data, interactive application command data, and/or resource data and automatically performs operations in accordance with the commands encoded in the skill proposition data, interactive application command data, and/or resource data 108.

In many embodiments, the process controller 104 includes a pseudo random or random result generator used to generate random results that are used by the decision engine to generate portions of the skill proposition data, interactive application command data, and/or resource data 108.

In various embodiments, the process controller 104 includes one or more interfaces, 124, 126 and 128 that operatively connect the process controller 104 to one or more interactive controllers, such as interactive controller 102, and to one or more credit processing controllers, such as credit processing controller 105.

In some embodiments, one or more of the process controller interfaces implement a process controller to device or server communication protocol employing an interprocess communication protocol so that the process controller and one or more of an interactive controller, a wagering sub-controller, and/or a session sub-controller may be implemented on the same device. In operation, the process controller interfaces provide application programming interfaces or the like that are used by the process controller to communicate outgoing data and receive incoming data by passing parameter data to another process or application running on the same device.

In some embodiments, one or more of the process controller interfaces implement a process controller communication protocol employing an interdevice communication protocol so that the process controller may be implemented on a device separate from the one or more interactive controllers, the one or more session sub-controllers and/or the one or more wagering sub-controllers. The interdevice protocol may utilize a wired communication bus or wireless connection as a physical layer. In various embodiments, one or more of the process controller interfaces implement a process controller communication protocol employing a networking protocol so that the process controller may be operatively connected to the one or more interactive controllers, the one or more session sub-controllers, and/or the one or more wagering sub-controllers by a network. The networking protocol may utilize a wired communication bus or wireless connection as a physical layer. In many such embodiments, the network includes a cellular telephone network or the like and the one or more interactive controllers include a mobile device such as a smartphone or other device capable of using the telephone network. During operation, the one or more process controller interfaces communicate outgoing data to an external device or server by encoding the data into a signal and transmitting the signal to the external device or server. The one or more process controller interfaces receive incoming data from an external device or server by receiving a signal transmitted by the external device or server and decoding the signal to obtain the incoming data.

In several embodiments, the wagering sub-controller 136 is a controller for providing one or more wagers in accordance with one or more skill propositions provided by the level-based multiple outcome wagering system 100. Types of value of a wager can be one or more of several different types. Types of value of a wager can include, but are not limited to, a wager of an amount of credits corresponding to a real currency or a virtual currency, a wager of an amount of application credits earned through interaction with an interactive application, a wager of an amount of interactive elements of an interactive application, and a wager of an amount of objects used in an interactive application. A skill outcome determined for a wager in accordance with a skill proposition can increase or decrease an amount of the type of value used in the wager, such as, but not limited to, increasing or decreasing an amount of credits for a wager of credits. In various embodiments, a skill outcome determined for a wager in accordance with a skill proposition can increase or decrease an amount of a type of value that is different than a type of value of the wager, such as, but not limited to, increasing an amount of an object of an interactive application for a wager of credits.

In many embodiments, the process controller 104 includes one or more random number generators (RNGs) 138 for generating random outcomes. The wagering sub-controller uses the one or more random outcomes along with the chance-based component logic 130 to generate a chance-based component of a skill proposition.

In several embodiments, the process controller 104 includes a metering sub-controller 140 operatively connected to the credit processing controller 105 via interfaces 126 and 128. The metering sub-controller 140 communicates with the credit processing controller 105 to receive incoming credit data from the credit processing controller 105. The metering sub-controller 140 uses the incoming credit data to transfer credits into the level-based multiple outcome wagering system and onto one or more credit meters 142. The metering sub-controller 140 communicates outgoing credit data to the credit processing controller 105 to transfer credits off of the one or more credit meters 142 and out of the level-based multiple outcome wagering system.

In several embodiments, during operation, the metering sub-controller 140 communicates with the credit processing controller 105 to receive incoming credit data from the credit processing controller 105 and adds credits onto the one or more credit meters 110 at least partially on the basis of the incoming credit data. The one or more random number generators 138 execute processes that generate random results. The wagering sub-controller 136 uses the change-based component logic 134 and the random results to generate a chance-based component of a skill proposition. The wagering sub-controller uses the chance-based component along with the skill proposition logic 132 to generate a skill proposition. The skill proposition is communicated by the process controller as part of the application command and resource data 108 to the interactive controller 102. The interactive application 110 uses the skill proposition data along with the skill outcome logic 116 to generate a presentation for the use including the one or more user interfaces 112. One or more users interact with the one or more application user interfaces 112 through the one or more user interface input and output devices 114. The interactive application 110 determines a skill outcome based on the interactions of the one or more users and communicates data of the skill outcome as part of the application telemetry data 106 to the process controller 104. The wagering sub controller 136 receives the skill outcome data and instructs the metering sub-controller 140 to add credits to, or deduct credits from, the one or more credit meters 110 based in part on the skill outcome data. For example, in some embodiments, the metering sub-controller is instructed to add an amount of credits to a credit meter of the one or more credit meters 110 when the skill outcome indicates a win for a user associated with the credit meter. In various embodiments, the metering sub-controller is instructed to deduct an amount of credits from the credit meter when the skill outcome indicates a loss for the user. At an end of a multilevel wagering session, the metering sub-controller 140 transfers credits off of the one or more credit meters 110 and out of the level-based multiple outcome wagering system by communicating outgoing credit data to the credit processing controller 105.

In many embodiments, the one or more random number generators 138 generate random numbers by continuously generating pseudo random numbers using a pseudo random number generator. A most current pseudo random number is stored in a buffer thus constantly refreshing the buffer. In many embodiments, the buffer is refreshed at a rate exceeding 100 times per second. When the wagering sub-controller 136 requests a random result, the wagering sub-controller 136 receives the stored most current pseudo random number from the buffer. As timing between requests for a random result is not deterministic, the resulting output from the buffer is a random result such as a random number.

In some embodiments, a range of the value of a random number is mapped to one or more symbols representing one or more elements of a traditional chance-based proposition. In several such embodiments, a random number is mapped to a virtual card of a deck of virtual cards. In another such embodiment, the random number is mapped to a virtual face of a virtual die. In yet another such embodiment, the random number is mapped to symbol of a virtual reel strip on a virtual reel slot machine. In yet another such embodiment, the random number is mapped to a pocket of a virtual roulette wheel. In some embodiments, two or more random numbers are mapped to appropriate symbols to represent a completed chance-based proposition. In one such embodiment, two or more random numbers are mapped to faces of two or more virtual dice to simulate a random result generated by throwing two or more dice. In another such embodiment, multiple random numbers are mapped to virtual cards from a virtual deck of cards without replacement. In yet another such embodiment, two or more random numbers are mapped to two or more virtual reel strips to create stop positions for a virtual multi-reel slot machine.

In some embodiments, a wagering sub-controller determines a chance-based component and a skill proposition by executing proposition determination commands included in chance-based component logic and skill proposition logic that define processes of a multilevel wagering proposition where the proposition determination commands are formatted in a scripting language. In operation, a decision engine of a process controller generates the proposition determination commands in the form of a script written in the scripting language. The script includes the proposition determination commands that describe how the wagering sub-controller is to generate a skill proposition. The wagering sub-controller parses the script encoded in the chance proposition determination command data and executes the commands included in the script to generate the skill proposition.

In some embodiments, a wagering sub-controller determines a chance-based component and a skill proposition by executing proposition determination commands that define processes of the wagering user interface. In operation, a decision engine of a process controller generates the proposition determination commands. The wagering sub-controller receives the proposition determination commands and executes the proposition determination commands to generate the skill proposition.

In various embodiments, the process controller 104 uses a rule-based decision engine to automatically determine an amount of application credits to award to a user based at least in part on the application telemetry data 106 including skill outcome data and user interaction data with the interactive application 110 of the level-based multiple outcome wagering system. In numerous embodiments, the interactive application 110 is a skill-based interactive application and the application credits are awarded for a user's skillful interaction with the interactive application 110.

In some embodiments, the wagering sub-controller 136 uses a wagering user interface generator 148 to automatically generate wagering telemetry data 150 on the basis of amounts of credits on the one or more credit meters 142. The wagering telemetry data 150 is used by the process controller 104 to command the interactive controller 102 to automatically generate one or more wagering user interfaces 152 describing a state of wagered credit accumulation and loss for the level-based multiple outcome wagering system. When a user interacts with the one or more wagering user interfaces 152, wagering user interface telemetry data 150 is generated by the one or more wagering user interfaces 152 and communicated by the interactive controller 102 to the process controller 104 using interfaces 122 and 124.

In some embodiments, the wagering telemetry data 150 may include, but is not limited to, amounts of application credits and interactive elements earned, lost or accumulated through interaction with the interactive application 110, and credits, application credits and interactive elements amounts won, lost or accumulated.

In some embodiments, the skill proposition data, interactive application command data, and/or resource data 108 are communicated to the wagering user interface generator 148 and used as a partial basis for generation of the wagering telemetry data 150 communicated to the interactive controller 102.

In various embodiments, the wagering user interface generator 148 also receives chance-based component data that is used as a partial basis for generation of the wagering telemetry data 150 communicated to the interactive controller 102. In some embodiments, the chance-based component data also includes data about one or more states of a wager of the skill proposition as generated by the wagering sub-controller 136. In various such embodiments, the wagering user interface generator 148 generates a chance-based component generation process display and/or chance-based component state display using the one or more states of the chance-based component. The chance-based component generation process display and/or chance-based component state display is included in the wagering telemetry data 150 that is communicated to the interactive controller 102. The wagering process display and/or wagering state display is automatically displayed by the interactive controller 102 using the one or more wagering user interfaces 152. In other such embodiments, the one or more states of the chance-based component are communicated to the interactive controller 102 and the interactive controller 102 is instructed to automatically generate the chance-based component generation process display and/or chance-based component state display of the one or more wagering user interfaces 152 using the one or more states of the chance-based component for display.

In some embodiments, the chance-based component includes state data about execution of a chance-based proposition of the chance-based component logic 134, including but not limited to a final state, intermediate state and/or beginning state of the chance-based proposition. For example, in a chance-based proposition that is based on slot machine math, the final state of the chance-based proposition may be reel positions, in a chance-based proposition that is based on roulette wheel math, the final state may be a pocket where a ball may have come to rest, in a chance-based proposition that is a based on card math, the beginning, intermediate and final states may represent a sequence of cards being drawn from a deck of cards, etc.

In some embodiments, an interactive controller generates a wagering user interface by executing commands that define processes of the wagering user interface where the commands are formatted in a scripting language. In operation, a wagering user interface generator of a process controller generates commands in the form of a script written in the scripting language. The script includes commands that describe how the interactive controller is to display wagering outcome data. The completed script is encoded as wagering telemetry data and communicated to the interactive controller by the process controller. The interactive controller receives the wagering telemetry data and parses the script encoded in the wagering telemetry data and executes the commands included in the script to generate the wagering user interface.

In many embodiments, an interactive controller generates a wagering user interface based on a document written in a document markup language that includes commands that define processes of the wagering user interface. In operation, a wagering user interface generator of a process controller generates a document composed in the document markup language. The document includes commands that describe how the interactive controller is to display wagering outcome data. The completed document is encoded as wagering telemetry data and communicated to the interactive controller by the process controller. The interactive controller receives the wagering telemetry data and parses the document encoded in the wagering telemetry data and executes the commands encoded into the document to generate the wagering user interface.

In some embodiments, an interactive controller generates a wagering user interface by executing commands that define processes of the wagering user interface. In operation, a wagering user interface generator of a process controller generates the commands and encodes the commands into wagering telemetry data that is communicated to the interactive controller by the process controller. The interactive controller receives the wagering telemetry data and executes the commands encoded in the wagering telemetry data to generate the wagering user interface.

In various embodiments, an interactive controller includes a data store of graphic and audio display resources that the interactive controller uses to generate a wagering user interface as described herein.

In many embodiments, a process controller communicates graphic and audio display resources as part of wagering telemetry data to an interactive controller. The interactive controller uses the graphic and audio display resources to generate a wagering user interface as described herein.

In many embodiments, the process controller 104 may additionally include various audit logs and activity meters.

The process controller 104 can further operatively connect to a metering sub-controller to determine an amount of credit or interactive elements available and other wagering metrics of a multilevel wagering proposition. Thus, the process controller 104 may potentially affect an amount of credits in play for participation in the wagering events of the multilevel wagering proposition provided by the wagering sub-controller. In some embodiments, the process controller 104 can also couple to a centralized server for exchanging various data related to users and the activities of the users during utilization of a level-based multiple outcome wagering system.

In a number of embodiments, communication of chance-based component determination commands and skill proposition commands between the wagering sub-controller 136 and the process controller 104 can further be used to communicate various wagering control factors that the wagering sub-controller uses as input. Examples of wagering control factors include, but are not limited to, an amount of credits, amount of application credits, amount of interactive elements, or amounts of objects consumed wager, and/or a user's election to enter a jackpot round.

In many embodiments, two or more users can be engaged in using the interactive application 110 executed by the interactive controller 102. In various embodiments, a level-based multiple outcome wagering system can include an interactive application 110 that provides a skill-based interactive application that includes head-to-head play between a single user and a computing device, between two or more users against one another, or multiple users playing against a computer device and/or each other. In some embodiments, the interactive application 110 can be a skill-based interactive application where the user is not skillfully playing against the computer or any other user such as skill-based interactive applications where the user is effectively skillfully playing against himself or herself.

In some embodiments, the process controller 104 utilizes the one or more wagering user interfaces 152 to communicate certain interactive application data to the user, including but not limited to, club points, user status, control of the selection of choices, and messages which a user can find useful in order to adjust the interactive application experience or understand the wagering status of the user.

In some embodiments, the process controller 104 utilizes the one or more wagering user interfaces 152 to communicate aspects of a multilevel wagering proposition to a user including, but not limited to, amount of credits, application credits, interactive elements, or objects in play, and amounts of credits, application credits, interactive elements, or objects available.

In a number of embodiments, the wagering sub-controller 136 can accept multilevel wagering proposition factors including, but not limited to, modifications in the amount of credits, application credits, interactive elements, or objects wagered on each individual wagering event, entrance into a bonus round, and other factors. In several embodiments, the process controller 104 can communicate a number of factors back and forth to the wagering sub-controller, such that an increase/decrease in a wagered amount can be related to the change in user profile of the user in the interactive application. In this manner, a user can control a wager amount per wagering event in accordance with the multilevel wagering proposition with the change mapping to a parameter or component that is applicable to the interactive application experience.

In some embodiments, the process controller 104 includes a session sub-controller 154 is used to regulate a level-based multiple outcome wagering system session.

In various embodiments, the session sub-controller 154 includes one or more session sub-controller interfaces that operatively connect the session sub-controller 154 to one or more wagering sub-controllers, metering sub-controllers and pooled bet sub-controllers through their respective interfaces.

In some embodiments, one or more of the session sub-controller interfaces implement a session sub-controller to device or server communication protocol employing an interprocess communication protocol so that the session sub-controller and one or more of an interactive controller, a wagering sub-controller, and/or a process controller may be implemented on the same device. In operation, the session sub-controller interfaces provide application programming interfaces or the like that are used by the session sub-controller to communicate outgoing data and receive incoming data by passing parameter data to another process or application running on the same device.

In some embodiments, one or more of the session sub-controller interfaces implement a session sub-controller communication protocol employing an interdevice communication protocol so that the session sub-controller may be implemented on a device separate from the one or more interactive controllers, the one or more process controllers and/or the one or more wagering sub-controllers. The interdevice protocol may utilize a wired communication bus or wireless connection as a physical layer. In various embodiments, one or more of the session sub-controller interfaces implement a session sub-controller communication protocol employing a networking protocol so that the process session sub-controller may be operatively connected to the one or more interactive controllers, the one or more process controllers, and/or the one or more wagering sub-controllers by a network. The networking protocol may utilize a wired communication bus or wireless connection as a physical layer. In many such embodiments, the network includes a cellular telephone network or the like and the one or more interactive controllers include a mobile device such as a smartphone or other device capable of using the telephone network. During operation, the one or more session sub-controller interfaces communicate outgoing data to an external device or server by encoding the data into a signal and transmitting the signal to the external device or server. The one or more session sub-controller interfaces receive incoming data from an external device or server by receiving a signal transmitted by the external device or server and decoding the signal to obtain the incoming data.

In various embodiments, components of the process controller 104 communicate session data to the session sub-controller. The session data may include, but is not limited to, user data, interactive controller data, pooled bet and side bet data, process controller data and wagering sub-controller data used by the session sub-controller to regulate a level-based multiple outcome wagering system session.

In some embodiments, the session sub-controller 154 may also assert control of a level-based multiple outcome wagering system session by communicating session control data to components of the process controller 104. Such control may include, but is not limited to, commanding the process controller 104 to end a level-based multiple outcome wagering system session, initiating wagering in a level-based multiple outcome wagering system session, ending wagering in a level-based multiple outcome wagering system session but not ending a user's use of the interactive application portion of the level-based multiple outcome wagering system, and changing from real credit wagering in a level-based multiple outcome wagering system to virtual credit wagering, or vice versa.

In many embodiments, the session sub-controller 154 manages user profiles for a plurality of users. The session sub-controller 154 stores and manages data about users in order to provide authentication and authorization of users of the level-based multiple outcome wagering system 100. In some embodiments, the session sub-controller 154 also manages geolocation information to ensure that the level-based multiple outcome wagering system 100 is only used by users in jurisdictions were wagering is approved. In various embodiments, the session sub-controller 154 stores application credits that are associated with the user's use of the interactive application of the level-based multiple outcome wagering system 100.

In some embodiments, the session sub-controller 154 communicates user and session management data to the user using a management user interface (not shown) of the interactive controller. The user interacts with the management user interface and the management user interface generates management telemetry data that is communicated to the session sub-controller 154 via interfaces 122 and 124.

In some embodiments, the wagering sub-controller 136 communicates wagering session data to the session sub-controller 154. In various embodiments, the session sub-controller communicates wagering session control data to the wagering sub-controller 136.

In many embodiments, a level-based multiple outcome wagering system includes a level-based multiple outcome controller operatively connected to a process controller 104 via a one or more level-based multiple outcome interfaces. The level-based multiple outcome controller includes promotional outcome allocation rules for allocating a promotional outcome of credits to a user when the process controller 104 requests that the promotional outcome be generated. The level-based multiple outcome controller further includes one or more promotional credit meters for storing data about one or more pools of promotional credits that are available to provide to user as a promotional outcome. The level-based multiple outcome controller further includes a database for storing data about promotion pools of credits. In some embodiments, the level-based multiple outcome controller supports a plurality of types of skill games provided by one or more interactive applications, such as interactive application 110. In many embodiments, the database is used to store data of skill metrics of user's skillful play of a skill game provided the interactive application 110. In various embodiments, the database further stores data of wagering metrics of users' wagering when using the level-based multiple outcome wagering system.

In some embodiments, a process controller operates as an interface between an interactive controller and a wagering sub-controller. By virtue of this construction, the wagering sub-controller is isolated from the interactive controller allowing the interactive controller to operate in an unregulated environment while allowing the wagering sub-controller to operate in a regulated environment.

In some embodiments, a single wagering sub-controller may provide services to two or more interactive controllers and/or two or more process controllers, thus allowing a level-based multiple outcome wagering system to operate over a large range of scaling.

In various embodiments, multiple types of interactive controllers using different operating systems may be interfaced to a single type of process controller and/or wagering sub-controller without requiring customization of the process controller and/or the wagering sub-controller.

In many embodiments, an interactive controller may be provided as a user device under control of a user while maintaining the wagering sub-controller in an environment under the control of a regulated operator of wagering equipment.

In several embodiments, data communicated between the controllers may be encrypted to increase security of the level-based multiple outcome wagering system.

In some embodiments, a process controller isolates chance-based component logic and skill proposition logic as unregulated logic from a regulated wagering sub-controller, thus allowing errors in the skill proposition logic and/or chance-based component logic to be corrected, new skill proposition logic and/or chance-based component logic to be used, or modifications to be made to the skill proposition logic and/or chance-based component logic without a need for regulatory approval.

In various embodiments, an interactive application may require extensive processing resources from an interactive controller leaving few processing resources for the functions performed by a process controller and/or a wagering sub-controller. By virtue of the architecture described herein, processing loads may be distributed across multiple devices such that operations of the interactive controller may be dedicated to the interactive application and the processes of the process controller and/or wagering sub-controller are not burdened by the requirements of the interactive application.

In many embodiments, a level-based multiple outcome wagering system operates with its components being distributed across multiple devices. These devices can be connected by communication channels including, but not limited to, local area networks, wide area networks, local communication buses, and/or the like. The devices may communicate using various types of protocols, including but not limited to, networking protocols, device-to-device communications protocols, and the like.

In some embodiments, one or more components of a level-based multiple outcome wagering system are distributed in close proximity to each other and communicate using a local area network and/or a communication bus. In several embodiments, an interactive controller and a process controller of a level-based multiple outcome wagering system are in a common location and communicate with an external wagering sub-controller. In some embodiments, a process controller and a wagering sub-controller of a level-based multiple outcome wagering system are in a common location and communicate with an external interactive controller. In many embodiments, an interactive controller, a process controller, and a wagering sub-controller of a level-based multiple outcome wagering system are located in a common location. In some embodiments, a session sub-controller is located in a common location with a process controller and/or a wagering sub-controller.

In various embodiments, these multiple devices can be constructed from or configured using a single device or a plurality of devices such that a level-based multiple outcome wagering system is executed as a system in a virtualized space such as, but not limited to, where a wagering sub-controller and a process controller are large scale centralized servers in the cloud operatively connected to widely distributed interactive controllers via a wide area network such as the Internet or a local area network. In such embodiments, the components of a level-based multiple outcome wagering system may communicate using a networking protocol or other type of device-to-device communications protocol.

In some embodiments, a level-based multiple outcome wagering system is deployed over a local area network or a wide area network in an interactive configuration. An interactive configuration of a level-based multiple outcome wagering system includes an interactive controller operatively connected by a network to a process controller and a wagering sub-controller.

In some embodiments, a level-based multiple outcome wagering system is deployed over a local area network or a wide area network in a mobile configuration. A mobile configuration of a level-based multiple outcome wagering system is useful for deployment over wireless communication network, such as a wireless local area network or a wireless telecommunications network. A mobile configuration of a level-based multiple outcome wagering system includes an interactive controller operatively connected by a wireless network to a process controller and a wagering sub-controller.

In several embodiments, a centralized process controller is operatively connected to one or more interactive controllers and one or more wagering sub-controllers using a communication link. The centralized process controller can perform the functionality of a process controller across various level-based multiple outcome wagering systems.

In numerous embodiments, an interactive application server provides a host for managing head-to-head play operating over a network of interactive controllers connected to the interactive application server using a communication link. The interactive application server provides an environment where users can compete directly with one another and interact with other users.

<Credit Processing Controller>

In many embodiments, the credit processing controller 105 operatively connects to one or more credit input devices for generating incoming credit data from a credit input. Credit inputs can include, but are not limited to, credit items used to transfer credits. The incoming credit data are communicated by the credit processing controller 105 to the metering sub-controller 140. In various embodiments, the one or more credit input devices and their corresponding credit items include, but are not limited to: card readers for reading cards having magnetic stripes, RFID chips, smart chips, and the like; scanners for reading various types of printed indicia printed on to various types of media such as vouchers, coupons, TITO tickets, rewritable cards, or the like; and bill validator and/or coin validators that receive and validate paper and/or coin currency or tokens.

In various embodiments, the credit processing controller 105 includes one or more credit output devices 146 for generating a credit output based on outgoing credit data 192 communicated from the wagering sub-controller. Credit outputs can include, but are not limited to, credit items used to transfer credits. Types of credit output devices and their corresponding credit items may include, but are not limited to: writing devices that are used to write to cards having magnetic stripes, smart chips or the like; printers for printing various types of printed indicia onto vouchers, coupons, TITO tickets, vouchers, rewritable cards or the like; and bill and/or coin dispensers that output paper and/or coin currency or tokens.

In some embodiments, the credit processing controller 105 is operatively connected to, and communicates with, a TITO system or the like to determine incoming credit data representing amounts of credits to be transferred into the level-based multiple outcome wagering system and to determine outgoing credit data representing amounts of credits to be transferred out of the level-based multiple outcome wagering system. In operation, the credit processing controller 105 communicates with a connected credit input device, such as a bill validator/ticket scanner, used to scan a credit input in the form of a TITO ticket having indicia of credit account data of a credit account of the TITO system. The credit processing controller 105 communicates the credit account data to the TITO system. The TITO system uses the credit account data to determine an amount of credits to transfer to the credit processing controller 105, and thus to the metering sub-controller 140 of the process controller 104. The TITO system communicates the amount of credits to the credit processing controller 105. The credit processing controller 105 communicates the amount of credits as incoming credit data to the metering sub-controller 140 and the metering sub-controller 140 credits one or more credit meters 142 with the amount of credits so that the credits can be used when a user makes wagers using the level-based multiple outcome wagering system 100.

In many embodiments, the credit processing controller 105 is operatively connected to a bill validator/ticket scanner as one of the one or more credit input devices 144. The credit processing controller 105 communicates with the bill validator/ticket scanner to scan currency used as a credit input to determine an amount of credits as incoming credit data to transfer credit to one or more credit meters 110 associated with one or more users. The skill metering sub-controller 140 credits the one or more credit meters 110 with the amount of credits so that the credits can be used when a user makes wagers using the level-based multiple outcome wagering system 100.

In some embodiments, the credit processing controller 105 can use a TITO system along with a ticket or voucher printer as one of the one or more credit output devices 146 to generate a TITO ticket as a credit output for a user. In operation, the credit processing controller 105 communicates, as outgoing credit data, data of an amount of credits to be credited to a credit account on the TITO system. The TITO system receives the amount of credits and creates the credit account and credits the credit account with the amount of credits. The TITO system generates credit account data for the credit account and communicates the credit account data to the credit processing controller 105. The credit processing controller 105 uses the ticket or voucher printer to print indicia of the credit account data onto a TITO ticket or voucher as a credit output.

In various embodiments, a credit processing interface 156 resident in the credit processing controller 105 provides an interface between the credit processing controller 156 and the process controller 104.

In some embodiments, the application control interface 122 implements a credit processing controller to process controller communication protocol employing an interprocess communication protocol so that the interactive controller 104 and the credit processing controller 105 may be implemented on the same device. In operation, the credit processing interface 156 provides application programming interfaces that are used by the credit processing controller 105 to communicate outgoing data and receive incoming data by passing parameter data to another process or application.

In some embodiments, the credit processing interface 156 implements an interactive controller to credit processing controller communication protocol employing an interdevice communication protocol so that the interactive controller and the credit processing controller may be implemented on different devices. The interdevice protocol may utilize a wired communication bus or wireless connection as a physical layer.

In various embodiments, the credit processing interface 156 implements an interactive controller to credit processing controller communication protocol employing a networking protocol so that the interactive controller 104 and the credit processing controller 105 may be implemented on different devices connected by a network. The networking protocol may utilize a wired communication bus or wireless connection as a physical layer. During operation, the credit processing interface 156 communicates outgoing data to an external device by encoding the data into a signal and transmitting the signal to an external device. The application control interface receives incoming data from an external device by receiving a signal transmitted by the external device and decoding the signal to obtain the incoming data.

In various embodiments, the credit processing controller 105 provides an interface to an electronic payment management system (not shown) such as an electronic wallet or the like. The electronic payment system provides credit account data that is used for generating incoming credit data as a credit input and outgoing credit data as a credit output.

Figure 2A:
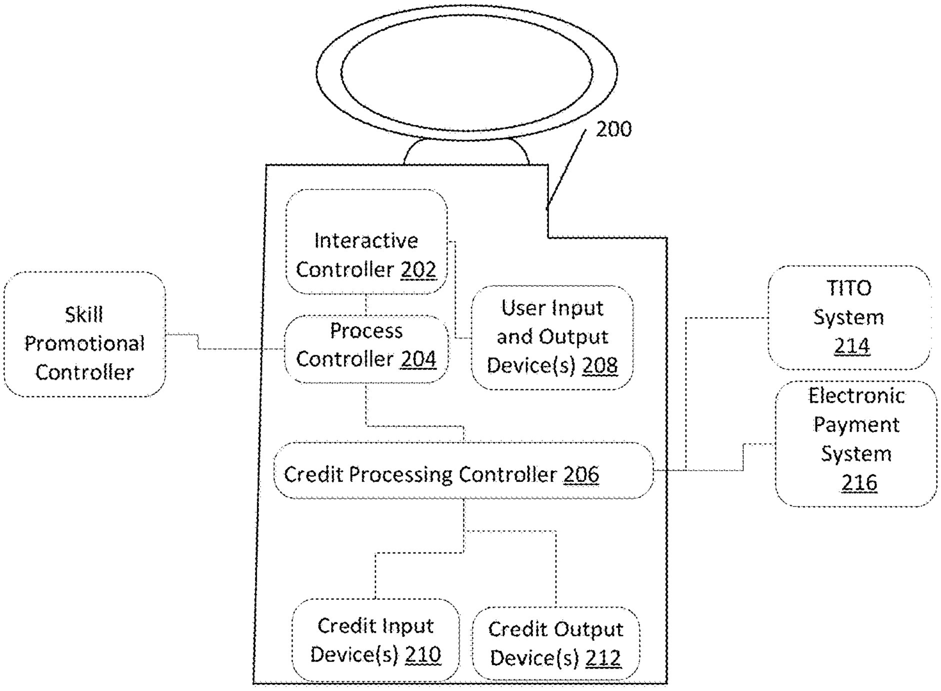
FIG. 2A is a diagram of an electronic gaming machine configuration of a level-based multiple outcome wagering system in accordance with various embodiments of the invention.

FIG. 2A is a diagram of an electronic gaming machine configuration of a level-based multiple outcome wagering system in accordance with various embodiments of the invention. Electronic gaming machine configurations of a level-based multiple outcome wagering system include, but are not limited to, electronic gaming machines such as slot machines, table games, video arcade consoles and the like. An electronic gaming machine configuration of a level-based multiple outcome wagering system 200 includes an interactive controller 202, a process controller 204 and a credit processing controller 206 contained in an enclosure such as a housing, cabinet, casing or the like. The enclosure may further include one or more user accessible openings or surfaces that may be used to mount one or more user accessible user input devices and user output devices 208, one or more user accessible credit input devices 210 and one or more credit output devices 212. The interactive controller 202 communicates with the user input devices to detect user interactions with the level-based multiple outcome wagering system and commands and controls the user output devices to provide a user interface to one or more users of the level-based multiple outcome wagering system as described herein. The process controller 204 communicates with the credit processing controller 206 or user credit processing devices 210 and 212 to transfer credits into and out of the level-based multiple outcome wagering system as described herein.

In many embodiments, the process controller 204 is operatively connected to an external session sub-controller (not shown). The session sub-controller may provide session control for a wagering session or may provide services for management of a player account for the storage of player points, application credits and the like.

In various embodiments, the process controller 204 is operatively connected to the credit processing controller 206. In many embodiments, the credit processing controller 206 is operatively connected to one or more credit input devices 210 for generating incoming credit data from a credit input as described herein. The incoming credit data are communicated to the process controller 204. In various embodiments, the one or more credit input devices and their corresponding credit items include, but are not limited to: card readers for reading cards having magnetic stripes, RFID chips, smart chips, and the like; scanners for reading various types of printed indicia printed on to various types of media such as vouchers, coupons, TITO tickets, rewritable cards, or the like; and bill validators and/or coin validators that receive and validate paper and/or coin currency or tokens.

In various embodiments, the credit processing controller 206 is operatively connected to the one or more credit output devices 212 for generating a credit output based on outgoing credit data communicated from the process controller 204. Credit outputs can include, but are not limited to, credit items used to transfer credits. Types of credit output devices and their corresponding credit items may include, but are not limited to: writing devices that are used to write to cards having magnetic stripes, smart chips or the like; printers for printing various types of printed indicia onto vouchers, coupons, TITO tickets, vouchers, rewritable cards or the like; and bill and/or coin dispensers that output paper and/or coin currency or tokens.

In some embodiments, the credit processing controller 206 is operatively connected to, and communicates with, a TITO system 214 or the like to determine incoming credit data representing amounts of credits to be transferred into the level-based multiple outcome wagering system 200 and to determine outgoing credit data representing amounts of credits to be transferred out of the level-based multiple outcome wagering system 200. In operation, the credit processing controller 206 communicates with one of the one or more connected credit input devices 210, such as a bill validator/ticket scanner, used to scan a credit input in the form of a TITO ticket having indicia of credit account data of a credit account of the TITO system 214. The credit processing controller 206 communicates the credit account data to the TITO system 214. The TITO system 214 uses the credit account data to determine an amount of credits to transfer to the credit processing controller 206 of the level-based multiple outcome wagering system 200. The TITO system 214 communicates the amount of credits to the credit processing controller 206. The credit processing controller 206 communicates the amount of credits as incoming credit data to the process controller 204 which credits one or more credit meters with the amount of credits so that the credits can be used when a user makes wagers using the level-based multiple outcome wagering system 200.

In many embodiments, the credit processing controller 206 includes a bill validator/ticket scanner as one of the one or more credit input devices 210. The credit processing controller 206 communicates with the bill validator/ticket scanner to scan currency used as a credit input to determine an amount of credits as incoming credit data to transfer credit to one or more credit meters associated with one or more users. The process controller 204 credits the one or more credit meters with the amount of credits so that the credits can be used when a user makes wagers using the level-based multiple outcome wagering system 200.

In some embodiments, the credit processing controller 206 can use the TITO system 214 along with a ticket or voucher printer as one of the one or more credit output devices 212 to generate a TITO ticket as a credit output for a user. In operation, the credit processing controller 206 communicates, as outgoing credit data, data of an amount of credits to be credited to a credit account on the TITO system 214. The TITO system 214 receives the amount of credits and creates the credit account and credits the credit account with the amount of credits. The TITO system 214 generates credit account data for the credit account and communicates the credit account data to the credit processing controller 206. The credit processing controller 206 uses the ticket or voucher printer to print indicia of the credit account data onto a TITO ticket as a credit output.

In various embodiments, the credit processing controller 206 provides an interface to an electronic payment system 216 such an electronic wallet or the like. The electronic payment system 216 provides credit account data that is used for generating incoming credit data as a credit input and outgoing credit data as a credit output.

In some embodiments, the process controller 204 is operatively connected to a central determination controller (not shown). In operation, when a wagering sub-controller of the process controller 204 needs to determine a random result, the wagering sub-controller communicates a request to the central determination controller for the random result. The central determination controller receives the random result request and generates a random result in response to the random result request. The central determination controller communicates data of the random result to the process controller 204. The processing controller 204 receives the data of the random result and utilizes the random result as described herein. In some embodiments, the random result is drawn from a pool of pre-determined random results.

In various embodiments, the wagering process controller 204 may be operatively connected to a level-based multiple outcome controller along with one or more other process controllers of one or more other level-based multiple outcome wagering systems. The level-based multiple outcome controller provides services for the collection and provision of credits used by the process controller 204 to provide random results that have a promotional pooling component.

Figure 2B:
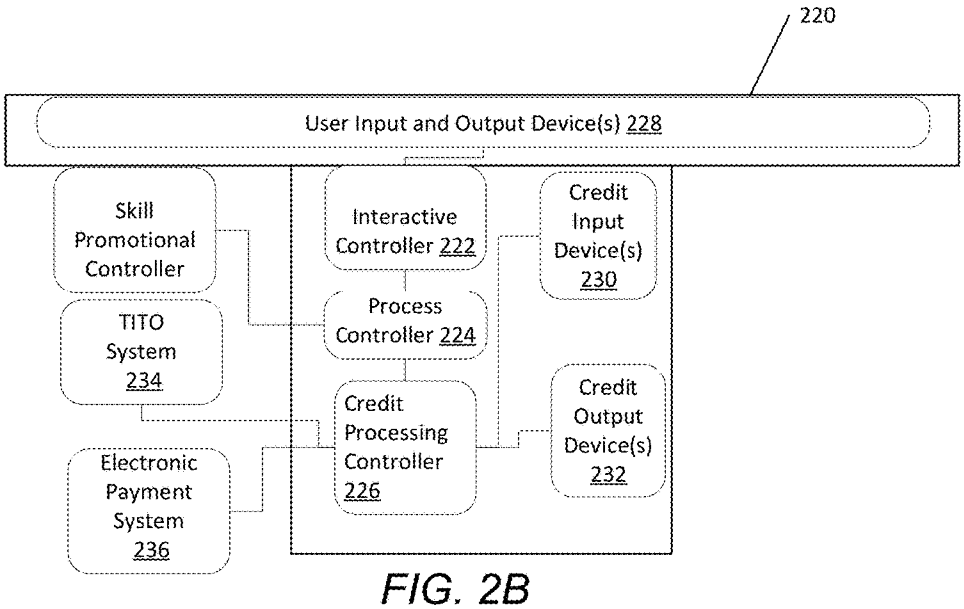
FIG. 2B is a diagram of a table electronic gaming machine configuration of a level-based multiple outcome wagering system in accordance with various embodiments of the invention.

FIG. 2B is a diagram of multiuser electronic gaming machine configuration of a level-based multiple outcome wagering system in accordance with various embodiments of the invention. Types of a multiuser electronic gaming machine configuration a level-based multiple outcome wagering system include, but are not limited to, multiuser electronic gaming machines, multiuser slot machines, multiuser table gaming devices, multi user video arcade consoles and the like. A multiuser electronic gaming machine configuration of a level-based multiple outcome wagering system 220 includes an interactive controller 222, a process controller 224 and a credit processing controller 226 contained in an enclosure such as a housing, cabinet, casing or the like. The enclosure may further include one or more user accessible openings or surfaces that may be used to mount one or more user accessible user input devices and user output devices 228, one or more user accessible credit input devices 230 and one or more user accessible credit output devices 212.

In some embodiments, two or more sets of credit input devices and credit output devices are provided so that each user of the multiuser electronic gaming machine configuration of a level-based multiple outcome wagering system 220 can have an associated set of credit input devices and credit output devices.

The interactive controller 222 communicates with the user input devices to detect user interactions with the level-based multiple outcome wagering system and commands and controls the user output devices to provide a user interface to one or more users of the level-based multiple outcome wagering system as described herein. The process controller 224 communicates with the credit processing controller 226 or user credit processing devices 230 and 232 to transfer credits into and out of the level-based multiple outcome wagering system as described herein.

In many embodiments, the process controller 224 is operatively connected to an external session sub-controller (not shown). The session sub-controller may provide session control for a wagering session or may provide services for management of a player account for the storage of player points, application credits and the like.

In various embodiments, the process controller 224 is operatively connected to the credit processing controller 226. In many embodiments, the credit processing controller 226 is operatively connected to one or more credit input devices 230 for generating incoming credit data from a credit input as described herein. The incoming credit data are communicated to the process controller 224. In various embodiments, the one or more credit input devices and their corresponding credit items include, but are not limited to: card readers for reading cards having magnetic stripes, RFID chips, smart chips, and the like; scanners for reading various types of printed indicia printed on to various types of media such as vouchers, coupons, TITO tickets, rewritable cards, or the like; and bill validators and/or coin validators that receive and validate paper and/or coin currency or tokens.

In various embodiments, the credit processing controller 226 is operatively connected to the one or more credit output devices 232 for generating a credit output based on outgoing credit data communicated from the process controller 224. Credit outputs can include, but are not limited to, credit items used to transfer credits. Types of credit output devices and their corresponding credit items may include, but are not limited to: writing devices that are used to write to cards having magnetic stripes, smart chips or the like; printers for printing various types of printed indicia onto vouchers, coupons, TITO tickets, vouchers, rewritable cards or the like; and bill and/or coin dispensers that output paper and/or coin currency or tokens.

In some embodiments, the credit processing controller 226 is operatively connected to, and communicates with, a TITO system 234 or the like to determine incoming credit data representing amounts of credits to be transferred into the level-based multiple outcome wagering system 220 and to determine outgoing credit data representing amounts of credits to be transferred out of the level-based multiple outcome wagering system 220. In operation, the credit processing controller 226 communicates with one of the one or more connected credit input devices 230, such as a bill validator/ticket scanner, used to scan a credit input in the form of a TITO ticket having indicia of credit account data of a credit account of the TITO system 234. The credit processing controller 226 communicates the credit account data to the TITO system 234. The TITO system 234 uses the credit account data to determine an amount of credits to transfer to the credit processing controller 226 of the level-based multiple outcome wagering system 220. The TITO system 234 communicates the amount of credits to the credit processing controller 226. The credit processing controller 226 communicates the amount of credits as incoming credit data to the process controller 224 which credits one or more credit meters with the amount of credits so that the credits can be used when a user makes wagers using the level-based multiple outcome wagering system 220.

In many embodiments, the credit processing controller 226 includes a bill validator/ticket scanner as one of the one or more credit input devices 230. The credit processing controller 226 communicates with the bill validator/ticket scanner to scan currency used as a credit input to determine an amount of credits as incoming credit data to transfer credit to one or more credit meters associated with one or more users. The process controller 224 credits the one or more credit meters with the amount of credits so that the credits can be used when a user makes wagers using the level-based multiple outcome wagering system 220.

In some embodiments, the credit processing controller 226 can use the TITO system 234 along with a ticket or voucher printer as one of the one or more credit output devices 232 to generate a TITO ticket as a credit output for a user. In operation, the credit processing controller 226 communicates, as outgoing credit data, data of an amount of credits to be credited to a credit account on the TITO system 234. The TITO system 234 receives the amount of credits and creates the credit account and credits the credit account with the amount of credits. The TITO system 234 generates credit account data for the credit account and communicates the credit account data to the credit processing controller 226. The credit processing controller 226 uses the ticket or voucher printer to print indicia of the credit account data onto a TITO ticket as a credit output.

In various embodiments, the credit processing controller 226 provides an interface to an electronic payment system 236 such an electronic wallet or the like. The electronic payment system 236 provides credit account data that is used for generating incoming credit data as a credit input and outgoing credit data as a credit output.

In some embodiments, the process controller 224 is operatively connected to a central determination controller (not shown). In operation, when a wagering sub-controller of the process controller 224 needs to determine a random result, the wagering sub-controller communicates a request to the central determination controller for the random result. The central determination controller receives the random result request and generates a random result in response to the random result request. The central determination controller communicates data of the random result to the process controller 224. The processing controller 224 receives the data of the random result and utilizes the random result as described herein. In some embodiments, the random result is drawn from a pool of pre-determined random results.

In various embodiments, the wagering process controller 224 may be operatively connected to a level-based multiple outcome controller along with one or more other process controllers of one or more other level-based multiple outcome wagering systems. The level-based multiple outcome controller provides services for the collection and provision of credits used by the process controller 224 to provide random results that have a promotional pooling component.

Figure 3:
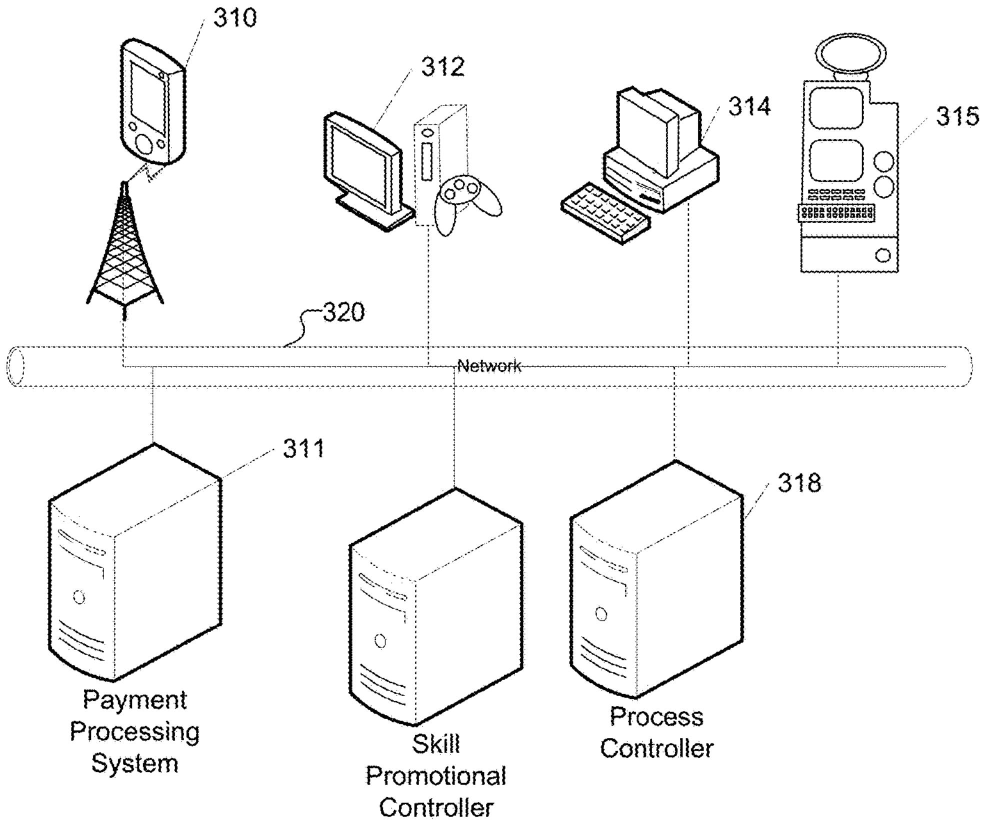
FIG. 3 is a diagram of distributed level-based multiple outcome wagering systems in accordance with various embodiments of the invention.

FIG. 3 is a diagram of distributed level-based multiple outcome wagering systems in accordance with various embodiments of the invention. An interactive controller, such as interactive controller 102 of FIG. 1, may be constructed from or configured using one or more processing devices that perform the operations of the interactive controller. An interactive controller in a distributed level-based multiple outcome wagering system may be constructed from or configured using any processing device having sufficient processing and communication capabilities that may be that perform the processes of an interactive controller in accordance with various embodiments of the invention. In some embodiments, the construction or configuration of the interactive controller may be achieved through the use of an application control interface, such as application control interface 122 of FIG. 1, and/or through the use of an interactive application, such as interactive application 110 of FIG. 1.

In some embodiments, an interactive controller may be constructed from or configured using an electronic gaming machine 315, such as a slot machine or the like. The electronic gaming machine 315 may be physically located in various types of gaming establishments.

In many embodiments, an interactive controller may be constructed from or configured using a portable device 310. The portable device 310 is a device that may wirelessly connect to a network. Examples of portable devices include, but are not limited to, a tablet computer, a personal digital assistant, and a smartphone.

In some embodiments, an interactive controller may be constructed from or configured using a gaming console 312.

In various embodiments, an interactive controller may be constructed from or configured using a personal computer 314.

In some embodiments, one or more processing devices, such as devices 310, 312, 314 and 315, may be used to construct a complete level-based multiple outcome wagering system and may be operatively connected using a communication link to a session and/or management controller.

Some level-based multiple outcome wagering systems in accordance with many embodiments of the invention can be distributed across a plurality of devices in various configurations. One or more interactive controllers of a distributed level-based multiple outcome wagering system, such as but not limited to, a mobile or wireless device 310, a gaming console 312, a personal computer 314, and an electronic gaming machine 315, are operatively connected with a process controller 318 of a distributed level-based multiple outcome wagering system using a communication link 320. Communication link 320 is a communications link that allows processing systems to communicate with each other and to share data. Embodiments of a communication link include, but are not limited to: a wired or wireless interdevice communication link; a serial or parallel interdevice communication bus; a wired or wireless network such as a Local Area Network (LAN), a Wide Area Network (WAN), or the link; or a wired or wireless communication network such as a wireless telecommunications network or plain old telephone system (POTS). In some embodiments, one or more processes of an interactive controller and a process controller as described herein are executed on the individual interactive controllers 310, 312, 314 and 315 while one or more processes of a process controller as described herein can be executed by the process controller 318.

In many embodiments, a distributed level-based multiple outcome wagering system and may be operatively connected using a communication link to a session controller (not shown), that performs the processes of a session controller as described herein.

In several embodiments, a distributed level-based multiple outcome wagering system and may be operatively connected using a communication link to credit processing system 311, that performs the processes of one or more credit processing systems as described herein.

In various embodiments, one or more distributed level-based multiple outcome wagering systems may be operatively connected to a level-based multiple outcome controller. The level-based multiple outcome controller provides services for the collection and provision of credits used to provide random results that have a promotional pooling component.

Figure 4A:
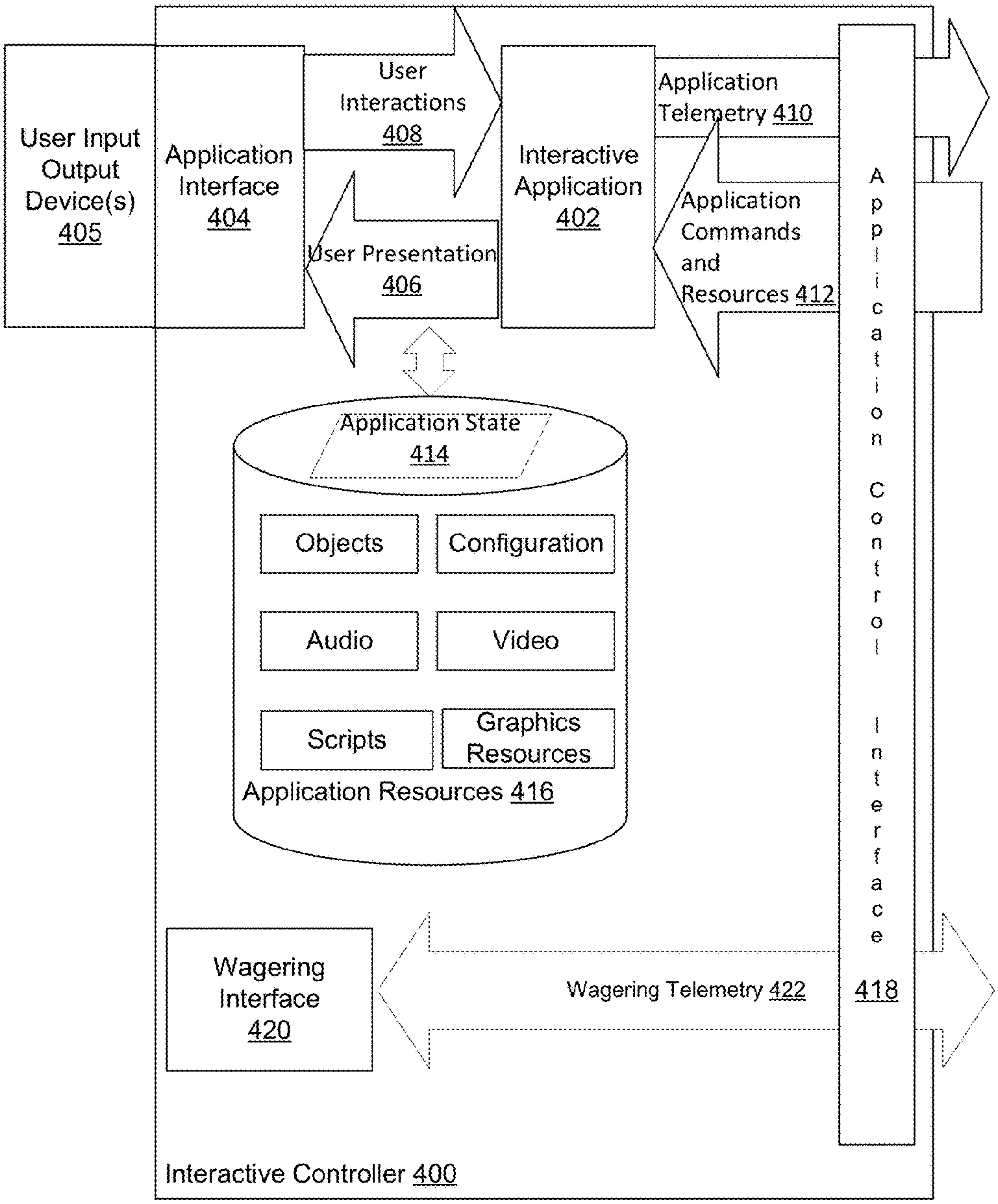
FIGS. 4A and 4B are diagrams of a structure of an interactive controller of a level-based multiple outcome wagering system in accordance with various embodiments of the invention.

Referring now to FIG. 4A, an interactive controller 400, suitable for use as interactive controller 102 of FIG. 1, provides an execution environment for an interactive application 402 of a level-based multiple outcome wagering system. In several embodiments, an interactive controller 400 of a level-based multiple outcome wagering system provides an interactive application 402 that generates an application interface 404 for interaction with by a user. The interactive application 402 generates a user presentation 406 that is presented to the user through the application interface 404 using one or more user input and output devices 405. The user presentation 406 may include audio features, visual features or tactile features, or any combination of these features. In various embodiments, the application interface 404 utilizes one or more user interface input and output devices 405 so that a user can interact with the user presentation 406. In various embodiments, user interface input devices include, but are not limited to: buttons or keys; keyboards; keypads; game controllers; joysticks; computer mice; track balls; track buttons; touch pads; touch screens; accelerometers; motion sensors; video input devices; microphones; and the like. In various embodiments, user interface output devices include, but are not limited to: audio output devices such as speakers, headphones, earbuds, and the like; visual output devices such as lights, video displays and the like; and tactile devices such as rumble pads, hepatic touch screens, buttons, keys and the like. The user's interactions 408 are included by the interactive application 402 in application telemetry data 410 that is communicated by interactive controller 400 to various other components of a level-based multiple outcome wagering system as described herein. The interactive application 402 receives application commands and resources 412 communicated from various other components of a level-based multiple outcome wagering system as described herein. In some embodiments, the application telemetry data 410 may include user interactions with objects of the interactive application and a skill outcome for a skill proposition presented to the user by the interactive application 402.

In some embodiments, various components of the interactive application 402 can read data from an application state 414 in order to provide one or more features of the interactive application. In various embodiments, components of the interactive application 402 can include, but are not limited to: a physics engine; a rules engine; an audio engine; a graphics engine and the like. The physics engine is used to simulate physical interactions between virtual objects in the interactive application 402. The rules engine implements the rules of the interactive application and a random number generator that may be used for influencing or determining certain variables and/or outcomes to provide a randomizing influence on the operations of the interactive application. The graphics engine is used to generate a visual representation of the interactive application state to the user. The audio engine is used to generate an audio representation of the interactive application state to the user.

During operation, the interactive application reads and writes application resources 416 stored on a data store of the interactive controller host. The application resources 416 may include objects having graphics and/or control logic used to provide application environment objects of the interactive application. In various embodiments, the resources may also include, but are not limited to, video files that are used to generate a portion of the user presentation 406; audio files used to generate music, sound effects, etc. within the interactive application; configuration files used to configure the features of the interactive application; scripts or other types of control code used to provide various features of the interactive application; and graphics resources such as textures, objects, etc. that are used by a graphics engine to render objects displayed in an interactive application.

In operation, components of the interactive application 402 read portions of the application state 414 and generate the user presentation 406 for the user that is presented to the user using the user interface 404. The user perceives the user presentation and provides user interactions 408 using the user input devices. The corresponding user interactions are received as user actions or inputs by various components of the interactive application 402. The interactive application 402 translates the user actions into interactions with the virtual objects of the application environment stored in the application state 414. Components of the interactive application use the user interactions with the virtual objects of the interactive application and the interactive application state 414 to update the application state 414 and update the user presentation 406 presented to the user. The process loops continuously while the user interacts with the interactive application of the level-based multiple outcome wagering system.

The interactive controller 400 provides one or more interfaces 418 between the interactive controller 400 and other components of a level-based multiple outcome wagering system, such as, but not limited to, a process controller. The interactive controller 400 and the other level-based multiple outcome wagering system components communicate with each other using the interface. The interface may be used to pass various types of data, and to communicate and receive messages, status data, commands and the like. In certain embodiments, the interactive controller 400 and a process controller communicate application commands and resources 412 and application telemetry data 410. In some embodiments, the communications include requests by the process controller that the interactive controller 400 update the application state 414 using data provided by the process controller.

In many embodiments, communications between a process controller and the interactive controller 400 includes a request that the interactive controller 400 update one or more resources 416 using data provided by the process controller. In a number of embodiments, the interactive controller 400 provides all or a portion of the application state to the process controller. In some embodiments, the interactive controller 400 may also provide data about one or more of the application resources 416 to the process controller. In some embodiments, the communication includes user interactions that the interactive controller 400 communicates to the process controller. The user interactions may be low level user interactions with the user interface 404, such as manipulation of an input device, or may be high level interactions with game objects as determined by the interactive application. The user interactions may also include resultant actions such as modifications to the application state 414 or game resources 416 resulting from the user's interactions taken in the level-based multiple outcome wagering system interactive application. In some embodiments, user interactions include, but are not limited to, actions taken by entities such as non-user characters (NPC) of the interactive application that act on behalf of or under the control of the user.

In various embodiments, the application commands and resources 412 include skill proposition application commands and/or resources used by the interactive application to generate a presentation of a skill proposition presented to a user and to determine a skill outcome based on the user's skillful interaction with the presentation of the skill proposition.

In some embodiments, the interactive controller 400 includes a wagering user interface 420 used to provide level-based multiple outcome wagering system telemetry data 422 to and from the user. The level-based multiple outcome wagering system telemetry data 422 from the level-based multiple outcome wagering system includes, but is not limited to, data used by the user to configure credit, application credit and interactive element wagers, and data about the chance-based proposition credits, application credits and interactive element wagers such as, but not limited to, credit, application credit and interactive element balances and credit, application credit and interactive element amounts wagered.

In some embodiments, the interactive controller includes one or more sensors (not shown). Such sensors may include, but are not limited to, physiological sensors that monitor the physiology of the user, environmental sensors that monitor the physical environment of the interactive controller, accelerometers that monitor changes in motion of the interactive controller, and location sensors that monitor the location of the interactive controller such as global positioning sensors (GPSs). The interactive controller 400 communicates sensor telemetry data to one or more components of the level-based multiple outcome wagering system.

Figure 4B:
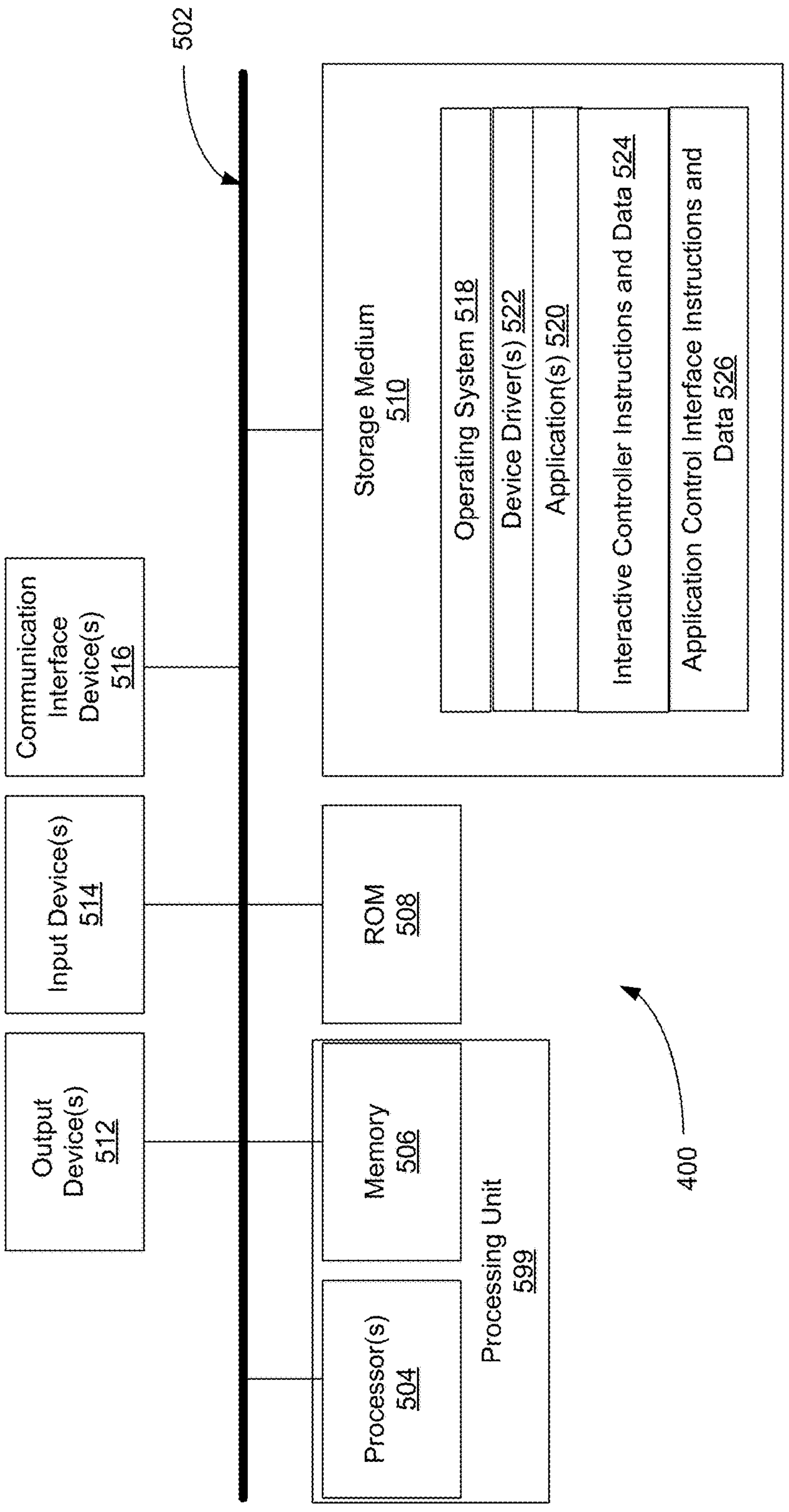

Referring now to FIG. 4B, interactive controller 400 includes a bus 502 that provides an interface for one or more processors 504, random access memory (RAM) 506, read only memory (ROM) 508, machine-readable storage medium 510, one or more user output devices 512, one or more user input devices 514, and one or more communication interface devices 516.

The one or more processors 504 may take many forms, such as, but not limited to: a central processing unit (CPU); a multi-processor unit (MPU); an ARM processor; a controller; a programmable logic device; or the like.

In the example embodiment, the one or more processors 504 and the random access memory (RAM) 506 form an interactive controller processing unit 599. In some embodiments, the interactive controller processing unit includes one or more processors operatively connected to one or more of a RAM, ROM, and machine-readable storage medium; the one or more processors of the interactive controller processing unit receive instructions stored by the one or more of a RAM, ROM, and machine-readable storage medium via a bus; and the one or more processors execute the received instructions. In some embodiments, the interactive controller processing unit is an ASIC (Application-Specific Integrated Circuit). In some embodiments, the interactive controller processing unit is a SoC (System-on-Chip).

Examples of output devices 512 include, but are not limited to, display screens; light panels; and/or lighted displays. In accordance with particular embodiments, the one or more processors 504 are operatively connected to audio output devices such as, but not limited to: speakers; and/or sound amplifiers. In accordance with many of these embodiments, the one or more processors 504 are operatively connected to tactile output devices like vibrators, and/or manipulators.

Examples of user input devices 514 include, but are not limited to: tactile devices including but not limited to, keyboards, keypads, foot pads, touch screens, and/or trackballs; non-contact devices such as audio input devices; motion sensors and motion capture devices that the interactive controller can use to receive inputs from a user when the user interacts with the interactive controller; physiological sensors that monitor the physiology of the user; environmental sensors that monitor the physical environment of the interactive controller; accelerometers that monitor changes in motion of the interactive controller; and location sensors that monitor the location of the interactive controller such as global positioning sensors.

The one or more communication interface devices 516 provide one or more wired or wireless interfaces for communicating data and commands between the interactive controller 400 and other devices that may be included in a level-based multiple outcome wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS) interface, a cellular or satellite telephone network interface; and the like.

The machine-readable storage medium 510 stores machine-executable instructions for various components of the interactive controller, such as but not limited to: an operating system 518; one or more device drivers 522; one or more application programs 520 including but not limited to an interactive application; and level-based multiple outcome wagering system interactive controller instructions and data 524 for use by the one or more processors 504 to provide the features of an interactive controller as described herein. In some embodiments, the machine-executable instructions further include application control interface/application control interface instructions and data 526 for use by the one or more processors 504 to provide the features of an application control interface/application control interface as described herein.

In various embodiments, the machine-readable storage medium 510 is one of a (or a combination of two or more of) a hard drive, a flash drive, a DVD, a CD, a flash storage, a solid state drive, a ROM, an EIEPROM, and the like.

In operation, the machine-executable instructions are loaded into memory 506 from the machine-readable storage medium 510, the ROM 508 or any other storage location. The respective machine-executable instructions are accessed by the one or more processors 504 via the bus 502, and then executed by the one or more processors 504. Data used by the one or more processors 504 are also stored in memory 506, and the one or more processors 504 access such data during execution of the machine-executable instructions. Execution of the machine-executable instructions causes the one or more processors 504 to control the interactive controller 400 to provide the features of a level-based multiple outcome wagering system interactive controller as described herein Although the interactive controller is described herein as being constructed from or configured using one or more processors and instructions stored and executed by hardware components, the interactive controller can be constructed from or configured using only hardware components in accordance with other embodiments. In addition, although the storage medium 510 is described as being operatively connected to the one or more processors through a bus, those skilled in the art of interactive controllers will understand that the storage medium can include removable media such as, but not limited to, a USB memory device, an optical CD ROM, magnetic media such as tape and disks. In some embodiments, the storage medium 510 can be accessed by the one or more processors 504 through one of the communication interface devices 516 or using a communication link. Furthermore, any of the user input devices or user output devices can be operatively connected to the one or more processors 504 via one of the communication interface devices 516 or using a communication link.

In some embodiments, the interactive controller 400 can be distributed across a plurality of different devices. In many such embodiments, an interactive controller of a level-based multiple outcome wagering system includes an interactive application server operatively connected to an interactive client using a communication link. The interactive application server and interactive application client cooperate to provide the features of an interactive controller as described herein.

In various embodiments, the interactive controller 400 may be used to construct other components of a level-based multiple outcome wagering system as described herein.

In some embodiments, components of an interactive controller and a process controller of a level-based multiple outcome wagering system may be constructed from or configured using a single device using processes that communicate using an interprocess communication protocol. In other such embodiments, the components of an interactive controller and a process controller of a level-based multiple outcome wagering system may communicate by passing messages, parameters or the like.

Figure 5:
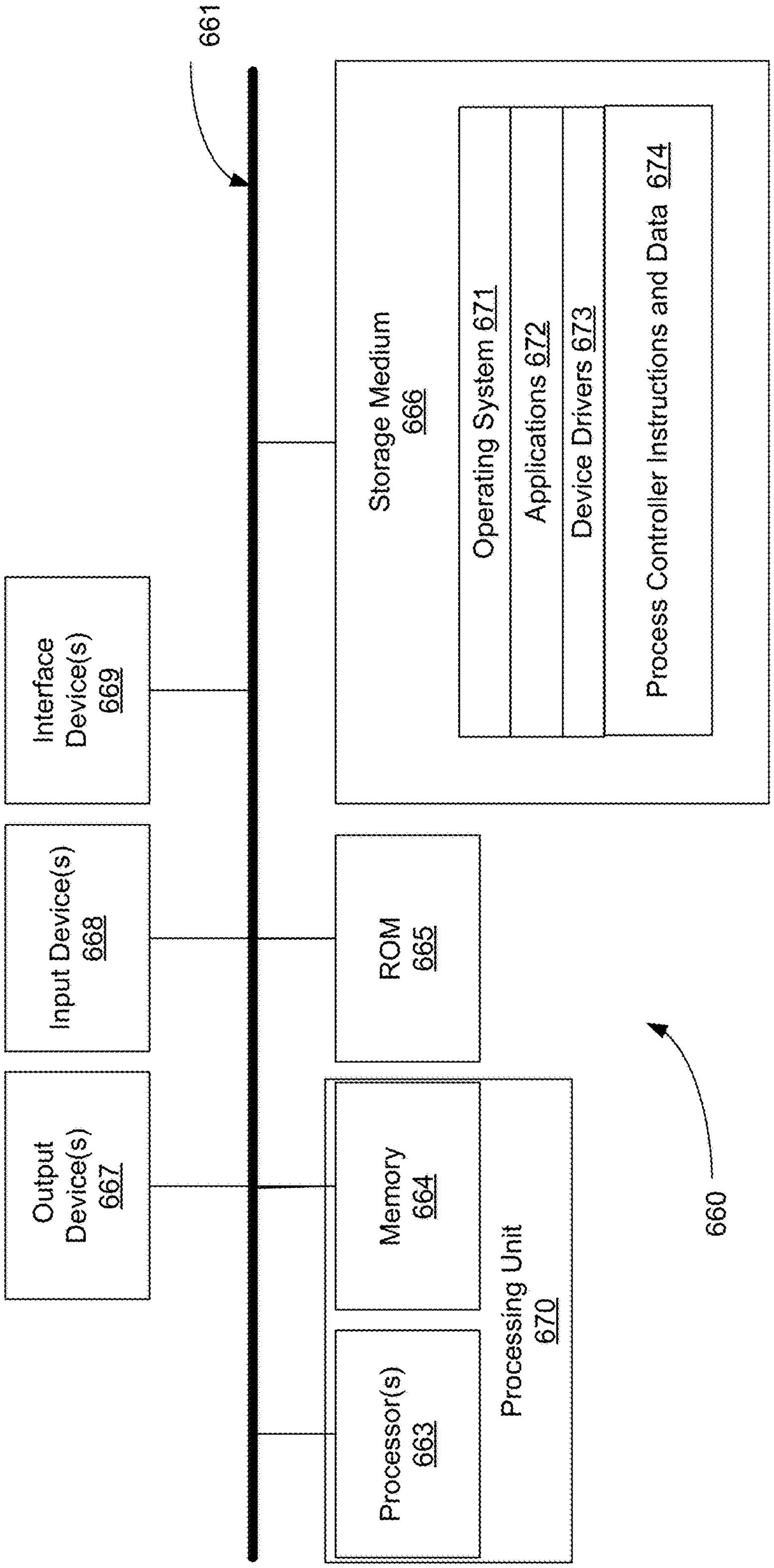
FIG. 5 is a diagram of a structure of a process controller of a level-based multiple outcome wagering system in accordance with various embodiments of the invention.

FIG. 5 is a diagram of a structure of a process controller, suitable for use as process controller 104 of FIG. 1, of a level-based multiple outcome wagering system in accordance with various embodiments of the invention. A process controller may be constructed from or configured using one or more processing devices that perform the operations of the process controller. In many embodiments, a process controller can be constructed from or configured using various types of processing devices including, but not limited to, a mobile device such as a smartphone, a personal digital assistant, a wireless device such as a tablet computer or the like, an electronic gaming machine such as a slot machine, a personal computer, a gaming console, a set-top box, a computing device, a controller, a server, or the like.

Process controller 660 includes a bus 661 providing an interface for one or more processors 663, random access memory (RAM) 664, read only memory (ROM) 665, machine-readable storage medium 666, one or more user output devices 667, one or more user input devices 668, and one or more communication interface and/or network interface devices 669.

The one or more processors 663 may take many forms, such as, but not limited to: a central processing unit (CPU); a multi-processor unit (MPU); an ARM processor; a programmable logic device; or the like.

Examples of output devices 667 include, include, but are not limited to: display screens; light panels; and/or lighted displays. In accordance with particular embodiments, the one or more processors 663 are operatively connected to audio output devices such as, but not limited to: speakers; and/or sound amplifiers. In accordance with many of these embodiments, the one or more processors 663 are operatively connected to tactile output devices like vibrators, and/or manipulators.

In the example embodiment, the one or more processors 663 and the random access memory (RAM) 664 form a process controller processing unit 670. In some embodiments, the process controller processing unit includes one or more processors operatively connected to one or more of a RAM, ROM, and machine-readable storage medium; the one or more processors of the process controller processing unit receive instructions stored by the one or more of a RAM, ROM, and machine-readable storage medium via a bus; and the one or more processors execute the received instructions. In some embodiments, the process controller processing unit is an ASIC (Application-Specific Integrated Circuit). In some embodiments, the process controller processing unit is a SoC (System-on-Chip).

Examples of user input devices 668 include, but are not limited to: tactile devices including but not limited to, keyboards, keypads, foot pads, touch screens, and/or trackballs; non-contact devices such as audio input devices; motion sensors and motion capture devices that the process controller can use to receive inputs from a user when the user interacts with the process controller 660.

The one or more communication interface and/or network interface devices 669 provide one or more wired or wireless interfaces for exchanging data and commands between the process controller 660 and other devices that may be included in a level-based multiple outcome wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS), cellular, or satellite telephone network interface; and the like.

The machine-readable storage medium 666 stores machine-executable instructions for various components of the process controller 660 such as, but not limited to: an operating system 671; one or more applications 672; one or more device drivers 673; and level-based multiple outcome wagering system process controller instructions and data 674 for use by the one or more processors 663 to provide the features of a process controller as described herein.

In various embodiments, the machine-readable storage medium 670 is one of a (or a combination of two or more of) a hard drive, a flash drive, a DVD, a CD, a flash storage, a solid state drive, a ROM, an EIEPROM, and the like.

In operation, the machine-executable instructions are loaded into memory 664 from the machine-readable storage medium 666, the ROM 665 or any other storage location. The respective machine-executable instructions are accessed by the one or more processors 663 via the bus 661, and then executed by the one or more processors 663. Data used by the one or more processors 663 are also stored in memory 664, and the one or more processors 663 access such data during execution of the machine-executable instructions. Execution of the machine-executable instructions causes the one or more processors 663 to control the process controller 660 to provide the features of a level-based multiple outcome wagering system process controller as described herein.

Although the process controller 660 is described herein as being constructed from or configured using one or more processors and instructions stored and executed by hardware components, the process controller can be composed of only hardware components in accordance with other embodiments. In addition, although the storage medium 666 is described as being operatively connected to the one or more processors through a bus, those skilled in the art of process controllers will understand that the storage medium can include removable media such as, but not limited to, a USB memory device, an optical CD ROM, magnetic media such as tape and disks. Also, in some embodiments, the storage medium 666 may be accessed by processor 663 through one of the interfaces or using a communication link. Furthermore, any of the user input devices or user output devices may be operatively connected to the one or more processors 663 via one of the interfaces or using a communication link.

In various embodiments, the process controller 660 may be used to construct other components of a level-based multiple outcome wagering system as described herein.

Figure 6:
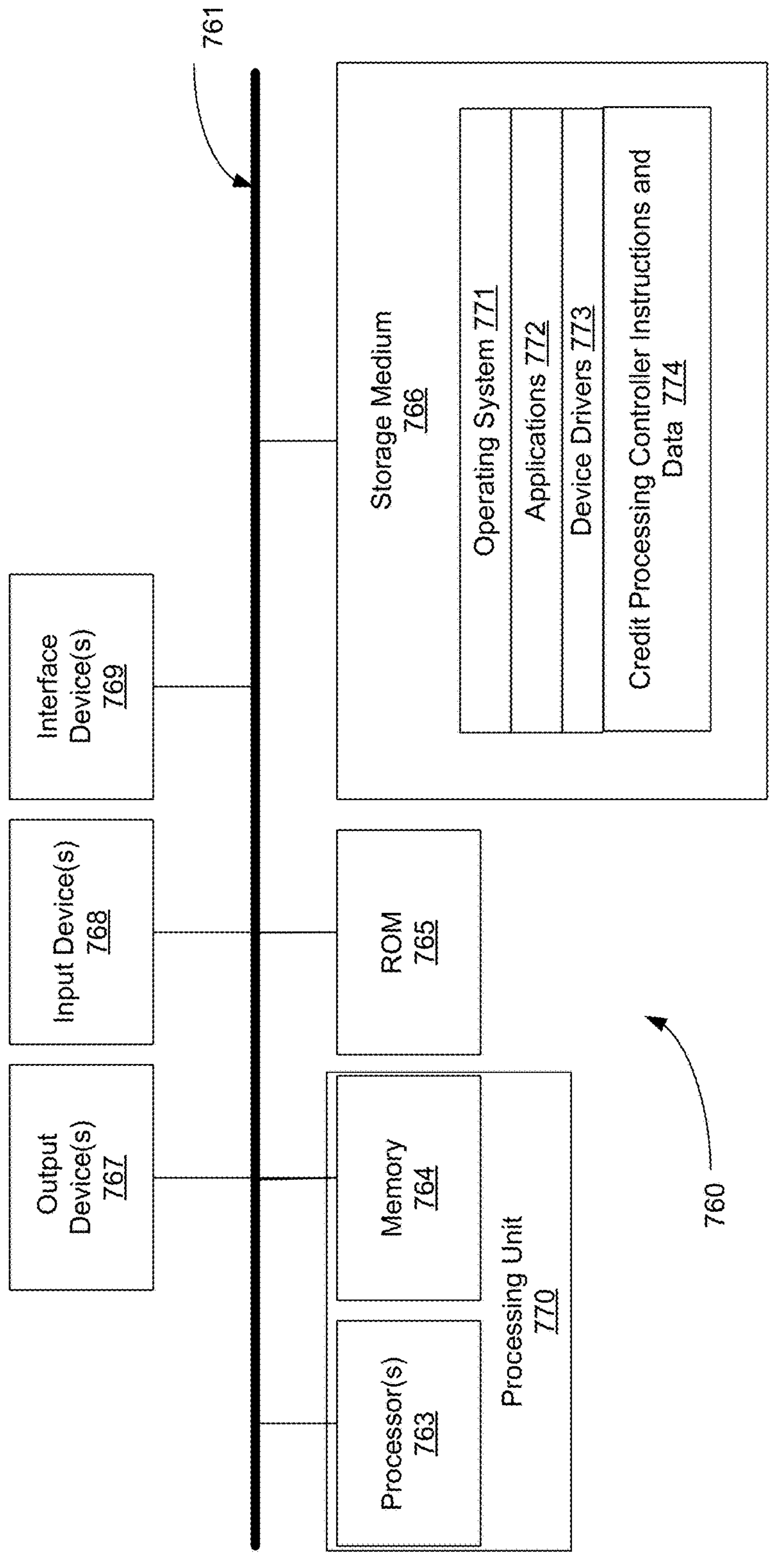
FIG. 6 is a diagram of a structure of a credit processing controller of a level-based multiple outcome wagering system in accordance with various embodiments of the invention.

FIG. 6 is a diagram of a structure of a credit processing controller, suitable for use as credit processing controller 105 of FIG. 1, of a level-based multiple outcome wagering system in accordance with various embodiments of the invention. A credit processing controller may be constructed from or configured using one or more processing devices that perform the operations of the credit processing controller. In many embodiments, a credit processing controller can be constructed from or configured using various types of processing devices including, but not limited to, a mobile device such as a smartphone, a personal digital assistant, a wireless device such as a tablet computer or the like, an electronic gaming machine such as a slot machine, a personal computer, a gaming console, a set-top box, a computing device, a controller, a server, or the like.

Credit processing controller 760 includes a bus 761 providing an interface for one or more processors 763, random access memory (RAM) 764, read only memory (ROM) 765, machine-readable storage medium 766, one or more user output devices 767, one or more user input devices 768, and one or more communication interface and/or network interface devices 769.

The one or more processors 763 may take many forms, such as, but not limited to: a central processing unit (CPU); a multi-processor unit (MPU); an ARM processor; a programmable logic device; or the like.

Examples of output devices 767 include, include, but are not limited to: display screens; light panels; and/or lighted displays. In accordance with particular embodiments, the one or more processors 763 are operatively connected to audio output devices such as, but not limited to: speakers; and/or sound amplifiers. In accordance with many of these embodiments, the one or more processors 763 are operatively connected to tactile output devices like vibrators, and/or manipulators.

In the example embodiment, the one or more processors 763 and the random access memory (RAM) 764 form a credit processing controller processing unit 770. In some embodiments, the credit processing controller processing unit includes one or more processors operatively connected to one or more of a RAM, ROM, and machine-readable storage medium; the one or more processors of the credit processing controller processing unit receive instructions stored by the one or more of a RAM, ROM, and machine-readable storage medium via a bus; and the one or more processors execute the received instructions. In some embodiments, the credit processing controller processing unit is an ASIC (Application-Specific Integrated Circuit). In some embodiments, the credit processing controller processing unit is a SoC (System-on-Chip).

Examples of user input devices 768 include, but are not limited to: tactile devices including but not limited to, keyboards, keypads, foot pads, touch screens, and/or trackballs; non-contact devices such as audio input devices; motion sensors and motion capture devices that the credit processing controller can use to receive inputs from a user when the user interacts with the credit processing controller 760.

The one or more communication interface and/or network interface devices 769 provide one or more wired or wireless interfaces for exchanging data and commands between the credit processing controller 760 and other devices that may be included in a level-based multiple outcome wagering system. Such wired and wireless interfaces include, but are not limited to: a Universal Serial Bus (USB) interface; a Bluetooth interface; a Wi-Fi interface; an Ethernet interface; a Near Field Communication (NFC) interface; a plain old telephone system (POTS), cellular, or satellite telephone network interface; and the like.

The machine-readable storage medium 766 stores machine-executable instructions for various components of the credit processing controller 760 such as, but not limited to: an operating system 771; one or more applications 772; one or more device drivers 773; and promotional credit processing controller instructions and data 774 for use by the one or more processors 763 to provide the features of a level-based multiple outcome controller as described herein.

In various embodiments, the machine-readable storage medium 770 is one of a (or a combination of two or more of) a hard drive, a flash drive, a DVD, a CD, a flash storage, a solid state drive, a ROM, an EIEPROM, and the like.

In operation, the machine-executable instructions are loaded into memory 764 from the machine-readable storage medium 766, the ROM 765 or any other storage location. The respective machine-executable instructions are accessed by the one or more processors 763 via the bus 761, and then executed by the one or more processors 763. Data used by the one or more processors 763 are also stored in memory 764, and the one or more processors 763 access such data during execution of the machine-executable instructions. Execution of the machine-executable instructions causes the one or more processors 763 to control the credit processing controller 760 to provide the features of a level-based multiple outcome wagering system credit processing controller as described herein.

Although the credit processing controller 760 is described herein as being constructed from or configured using one or more processors and instructions stored and executed by hardware components, the credit processing controller can be composed of only hardware components in accordance with other embodiments. In addition, although the storage medium 766 is described as being operatively connected to the one or more processors through a bus, those skilled in the art of credit processing controllers will understand that the storage medium can include removable media such as, but not limited to, a USB memory device, an optical CD ROM, magnetic media such as tape and disks. Also, in some embodiments, the storage medium 766 may be accessed by processor 763 through one of the interfaces or using a communication link. Furthermore, any of the user input devices or user output devices may be operatively connected to the one or more processors 763 via one of the interfaces or using a communication link.

In various embodiments, the credit processing controller 760 may be used to construct other components of a level-based multiple outcome wagering system as described herein.

Figure 7A:
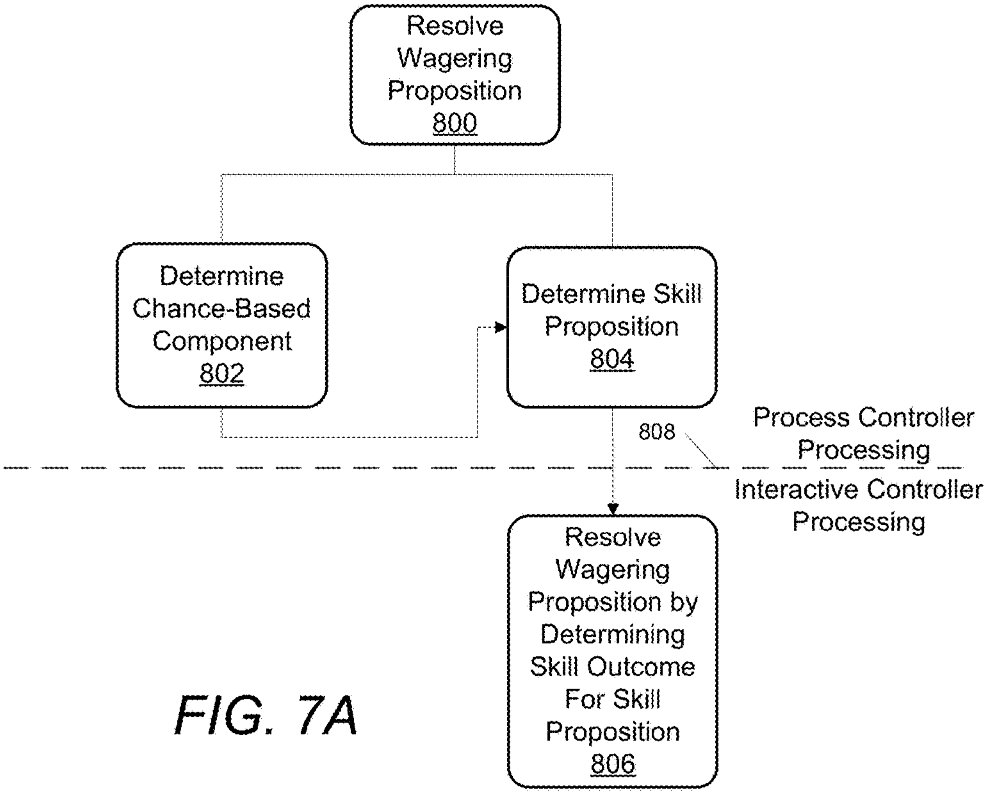
FIGS. 7A and 7B are block diagrams of a process of a level-based multiple outcome wagering system in accordance with various embodiments of the invention.

FIG. 7A is a block diagram of a process of a level-based multiple outcome wagering system during a wagering session in accordance with various embodiments of the invention. A level-based multiple outcome wagering system resolves 800 a wager proposition by determining 802 a chance-based component using one or more random outcomes. The random component is then used to determine 804 a skill proposition that will be presented to one or more users. The wager is resolved 806 by determining a skill outcome for the skill proposition.

In some embodiments, as indicated by dashed line 808, a process controller of the level-based multiple outcome wagering system performs processing for determining 802 the chance-based component and determining 804 the skill proposition while an interactive controller performs processing for determining 806 the skill outcome.

In an example embodiment, a multilevel wagering proposition of a skill wagering system is a head-to-head electronic card game played competitively by two players using a set of electronic cards. Each player wagers an amount of credits and the winning player receives all of the wagered credits minus an amount of credits for a hold of an operator of the skill wagering system. A process controller of the skill wagering system determines a random order of the electronic cards in the set of electronic cards as a chance-based component of the multilevel wagering proposition. The resultant randomized set of electronic cards are included in a skill proposition of the multilevel wagering proposition. The skill proposition may optionally includes instructions in accordance with the electronic card game. Data of the skill proposition is communicated to an interactive controller of the skill wagering system. The interactive controller receives the data of the skill proposition. The interactive controller resolves the multilevel wagering proposition by determining a skill outcome by executing the electronic card game using skill outcome logic specific to the electronic card game, the randomized set of electronic cards, and optionally any instructions in accordance with the electronic card game received from the process controller. The skill outcome includes information about which player has won the electronic card game.

Figure 7B:
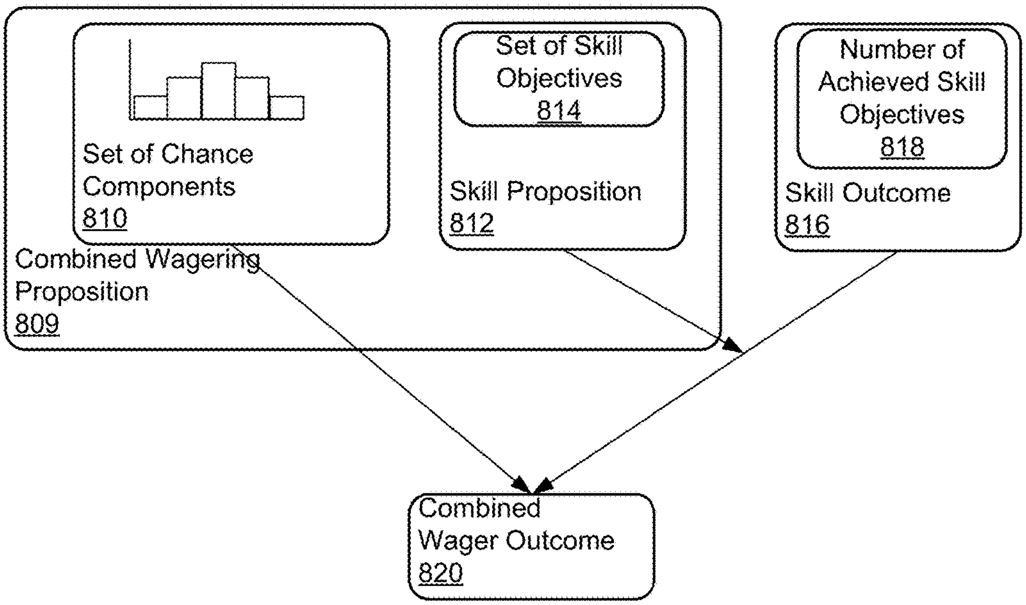

FIG. 7B is a block diagram of a multilevel wagering proposition of a self-reconfiguring wagering system during a wagering session in accordance with various embodiments of the invention. A combined multilevel wagering proposition 809 includes a set of chance outcome components 810 and a skill proposition 812 having a set of skill objectives 814 that correspond to the set of chance outcome components 810.

Figure 8:
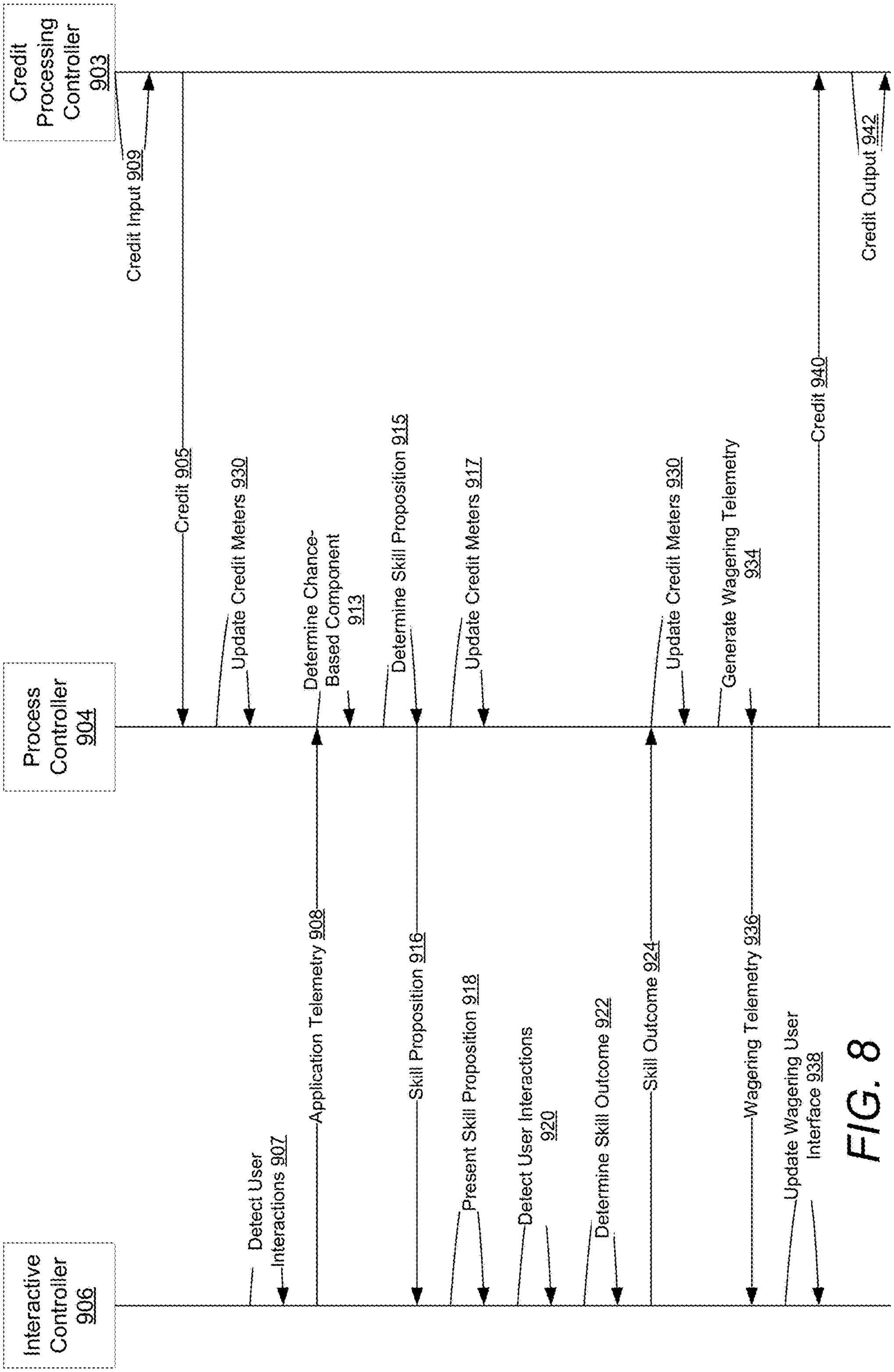
FIG. 8 is a sequence diagram of interactions between components of a level-based multiple outcome wagering system in accordance with various embodiments of the invention.

During operation, a self-reconfiguring wagering system presents the skill proposition to a user as a set of skill objectives to be achieved by the user. The self-reconfiguring wagering system determines a skill outcome 812 for the skill proposition including a number of skill objectives achieved by the user 812 when presented with the skill proposition. A combined wager outcome 820 is determined by combining the skill outcome 816 with the set of chance outcome components 810 to allocate the chance outcomes of the set of chance outcomes to the user FIG. 8 is a sequence diagram of interactions between components of a level-based multiple outcome wagering system during a wagering session in accordance with various embodiments of the invention. The components of the level-based multiple outcome wagering system include a process controller 904, such as process controller 104 of FIG. 1, an interactive controller 906, such as interactive controller 102 of FIG. 1, and a credit processing controller 903, such as credit processing controller 105 of FIG. 1.

In some embodiments, at a beginning of the wagering session, the process includes a credit input 909 to the level-based multiple outcome wagering system with process controller 904 communicating with the credit processing controller 903 to receive incoming credit data 905. The process controller 904 uses the incoming credit data to transfer credits onto one or more credit meters associated with one or more users of the level-based multiple outcome wagering system, thus transferring credits into the level-based multiple outcome wagering system and on to the one or more credit meters.

In many embodiments, the interactive controller 906 detects 907 one or more users performing a user interaction in an application interface of an interactive application provided by the interactive controller 906. The interactive controller 906 communicates application telemetry data 908 to the process controller 904. The application telemetry data 908 includes, but is not limited to, the user interaction detected by the interactive controller 906.

The process controller 904 receives the application telemetry data 908. Upon determination by the process controller 904 that the user interaction indicates a wagering event in accordance with a multilevel wagering proposition, the process controller 904 determines 913 a chance-based component of the multilevel wagering proposition and uses the chance-based component to determine 915 a skill proposition of the multilevel wagering proposition. The process controller 904 communicates data of the skill proposition 916 to the interactive controller 906. The process controller 904 updates 917 one or more credit meters associated with the one or more users based on amounts of credits wagered in the wagering event.

The interactive controller 906 receives the skill proposition data 916 from the process controller 904 and uses the skill proposition data 916 to generate and present 918 to the one or more users a skill proposition. The presentation of the skill proposition is presented to the one or more users in the user interface of the interactive application of the interactive controller 906. The interactive controller 906 detects 920 user interactions of the one or more users with the presentation of the skill proposition and determines 922 a skill outcome based on the detected user interactions and the skill proposition data 916. The interactive controller 906 communicates data of the skill outcome 924 to the process controller 904.

The process controller 904 receives the skill outcome data 924 and updates the one or more credit meters associated with the one or more users using the skill outcome data 924 and an amount of credits used for the wager and stores amounts of credits awarded from the executed wager in one or more intermediate data stores. The wagering sub-controller 902 communicates data of the chance outcome 914 of the executed wager to the process controller 904.

The process controller 904 receives the chance outcome data 914 and determines 915 a skill proposition based in part on the chance outcome data 914. The skill proposition includes interactive application command and resource data that the process controller 904 uses to command the interactive controller 906 to present a skill proposition to a user. The process controller 904 communicates data of the skill proposition 916 to the interactive controller 906.

The interactive controller 906 receives the skill proposition data 916. The interactive application executing on the interactive controller 906 uses the skill proposition data to generate and present 918 a skill proposition to the user. The interactive controller 906 detects 920 skillful user interactions with the skill proposition presentation of the interactive application and determines 922 a skill outcome based on the user's skillful interactions. The interactive controller 906 communicates data of the skill outcome 924 to the process controller 904.

The process controller 904 receives the skill outcome data 924 and updates 930 the one or more credit meters associated with the one or more users based on the skill outcome data 924 and the amount of credits wagered. The process controller 904 generates 934 wagering telemetry data 936 using the combined outcome data 928 and data of the updated one or more credit meters. The process controller 904 communicates the wagering telemetry data 936 to the interactive controller 906.

The interactive controller 906 receives the wagering telemetry data 936. The interactive controller 906 updates 936 a wagering user interface on a partial basis of the wagering telemetry data 936.

In many embodiments, upon determining that the wagering session is completed, such as by receiving a cashout communication from one or more users of the level-based multiple outcome wagering system, the process controller 904 transfers credits off of the one or more credit meters, generates outgoing credit data 940 on the basis of the credits transferred off of the one or more credit meters, and communicates the outgoing credit data 940 to the credit processing controller 903. The credit processing controller receives the outgoing credit data 940 and generates 942 a credit output as described herein, thus transferring credits off of the one or more credit meters and out of the level-based multiple outcome wagering system.

In some embodiments, at a beginning of the wagering session, the process includes an application credit input to the level-based multiple outcome wagering system with the process controller 904 communicating with the credit processing controller 903 to receive incoming application credit data. The process controller 902 uses the incoming application credit data to transfer application credits onto one or more application credit meters associated with one or more users of the level-based multiple outcome wagering system, thus transferring application credits into the level-based multiple outcome wagering system and on to the one or more application credit meters. The process controller 904 uses the skill outcome data 924 to determine an amount of application credit to award to a user based on the users skillful interactions with an interactive application executed by the interactive controller 905. Upon determining that the wagering session is completed, such as by receiving a cashout communication from one or more users of the level-based multiple outcome wagering system, the process controller 904 transfers application credits off of the one or more application credit meters, generates outgoing application credit data on the basis of the application credits transferred off of the one or more application credit meters, and communicates the outgoing application credit data to the credit processing controller 903. The credit processing controller receives the outgoing application credit data and generates an application credit output as described herein, thus transferring application credits off of the one or more application credit meters and out of the level-based multiple outcome wagering system.

Figure 9:
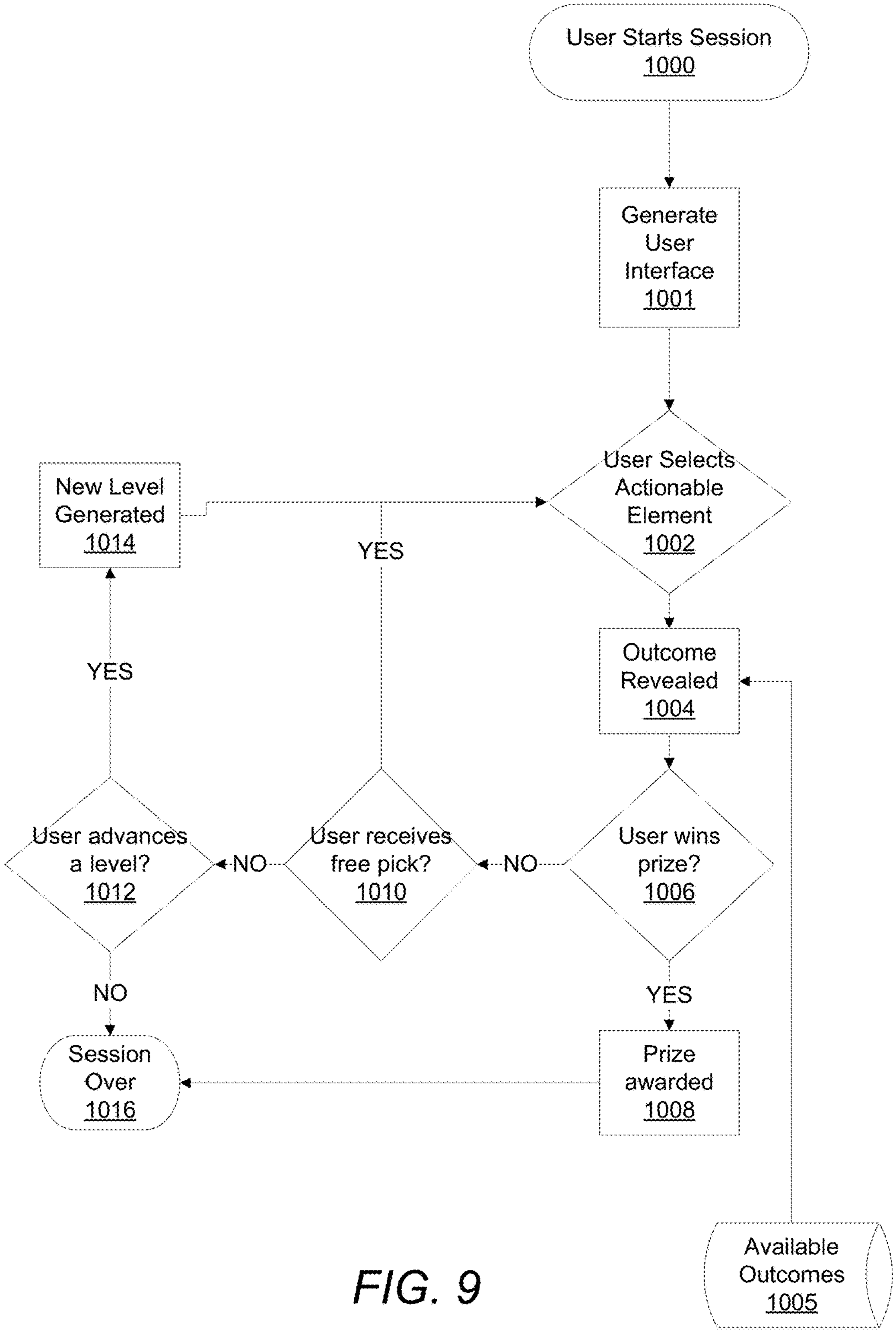
FIG. 9 is process flow diagram of a process to create a level-based system with multiple potential outcomes in accordance with various embodiments of the invention.
Figure 10:
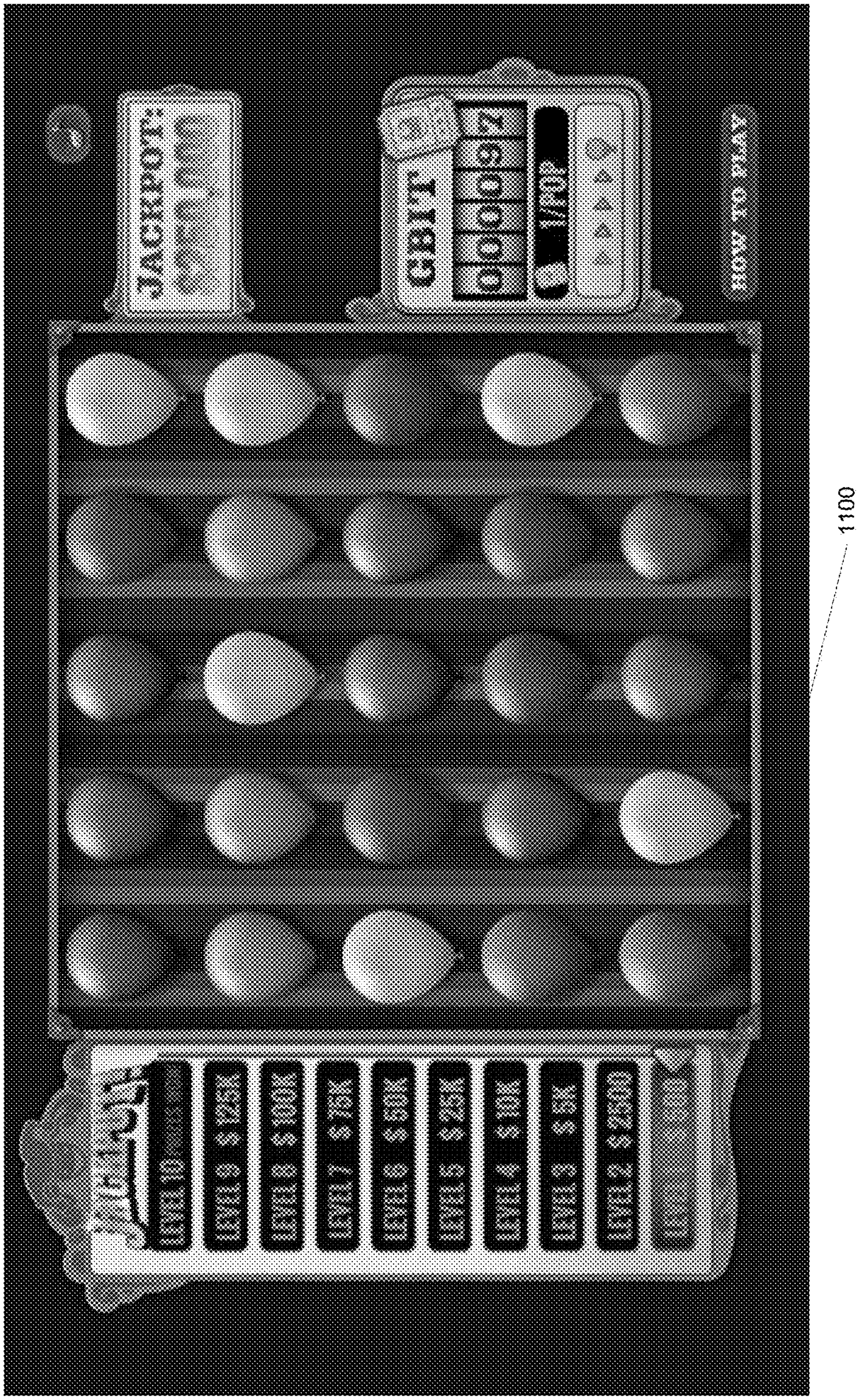
FIGS. 10, 11, 12 and 13 illustrate a user interface of an interactive application at various points during a multilevel wagering session in accordance with some embodiments of the invention.
Figure 11:
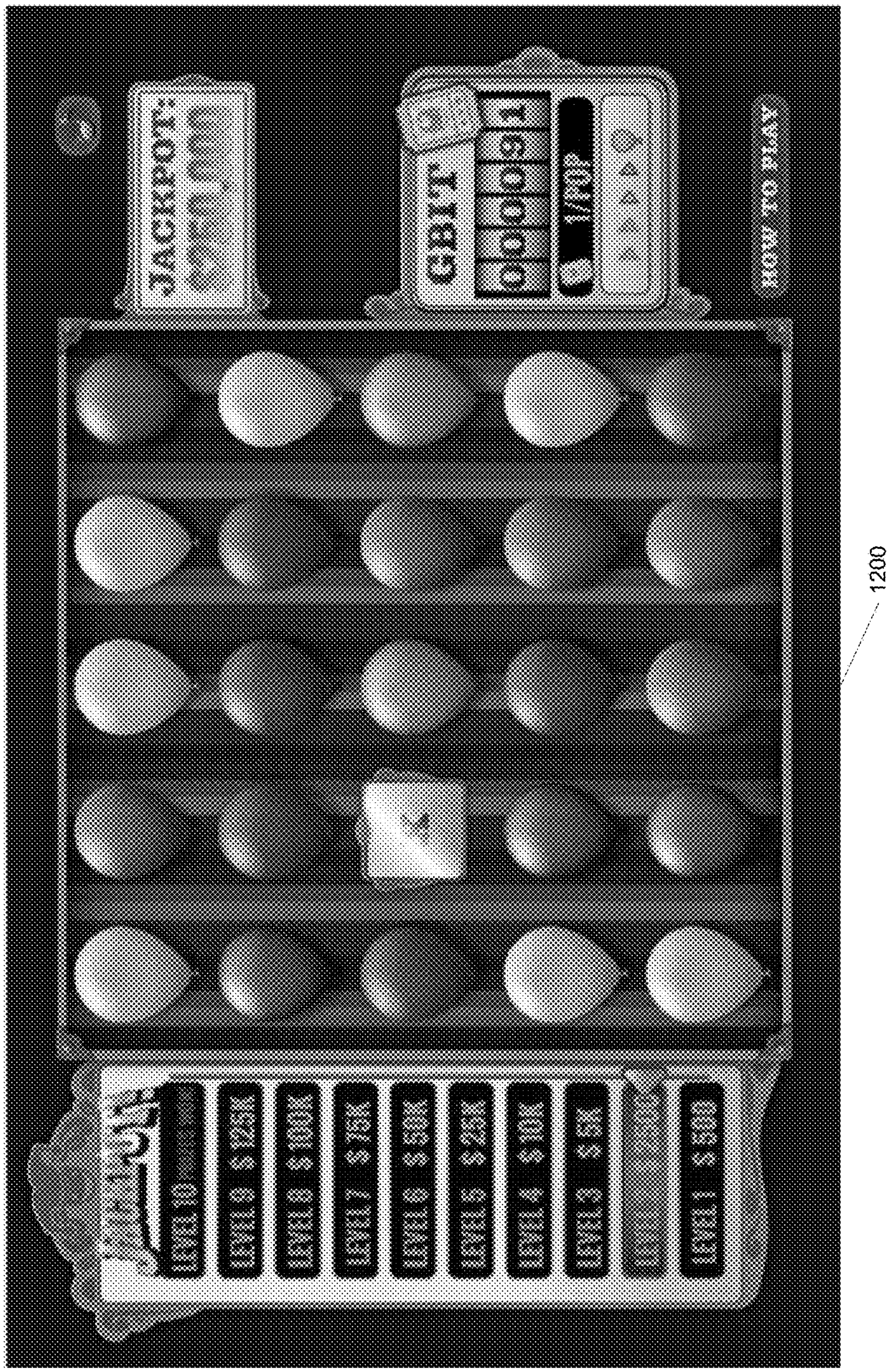
Figure 12:
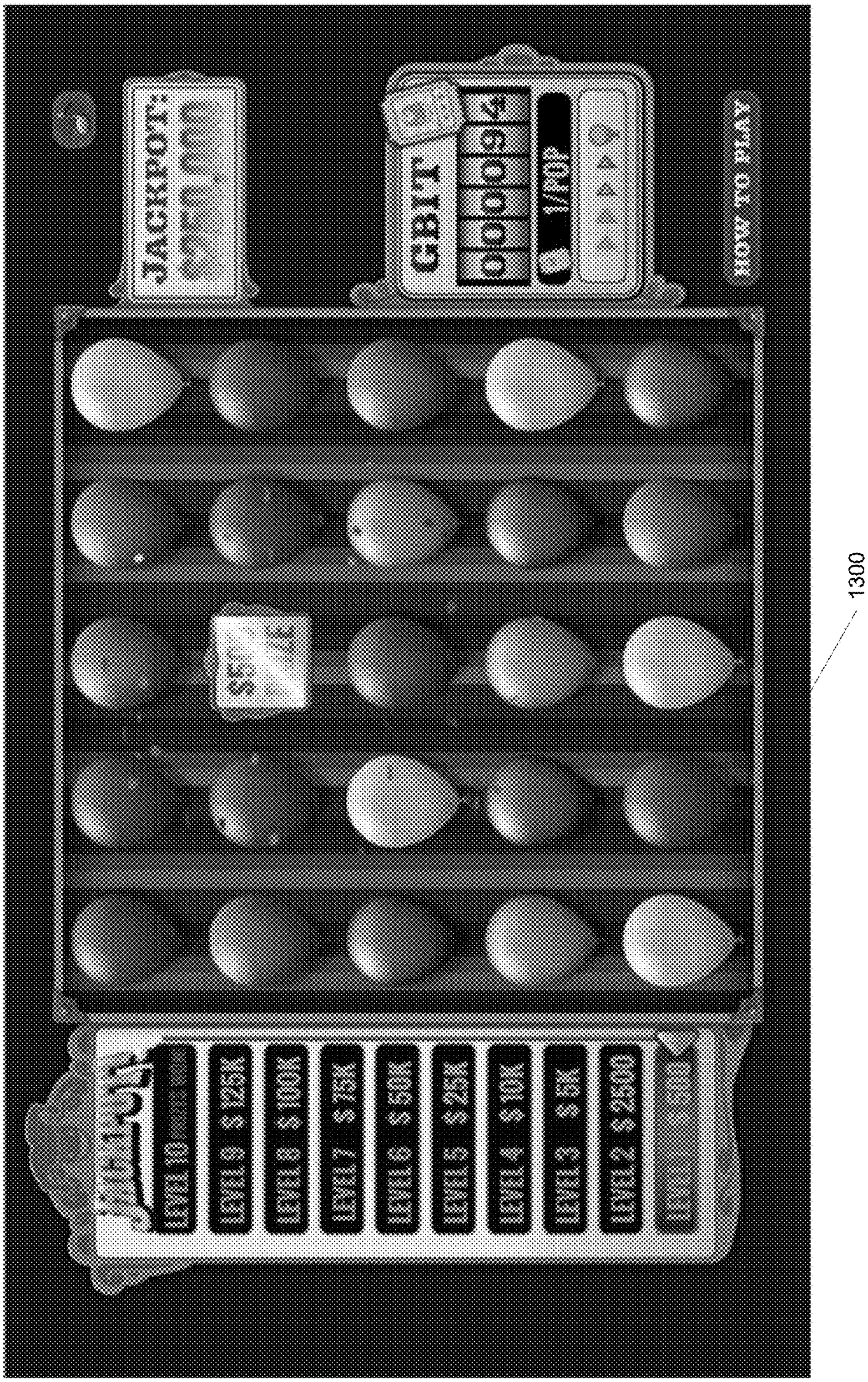
Figure 13:
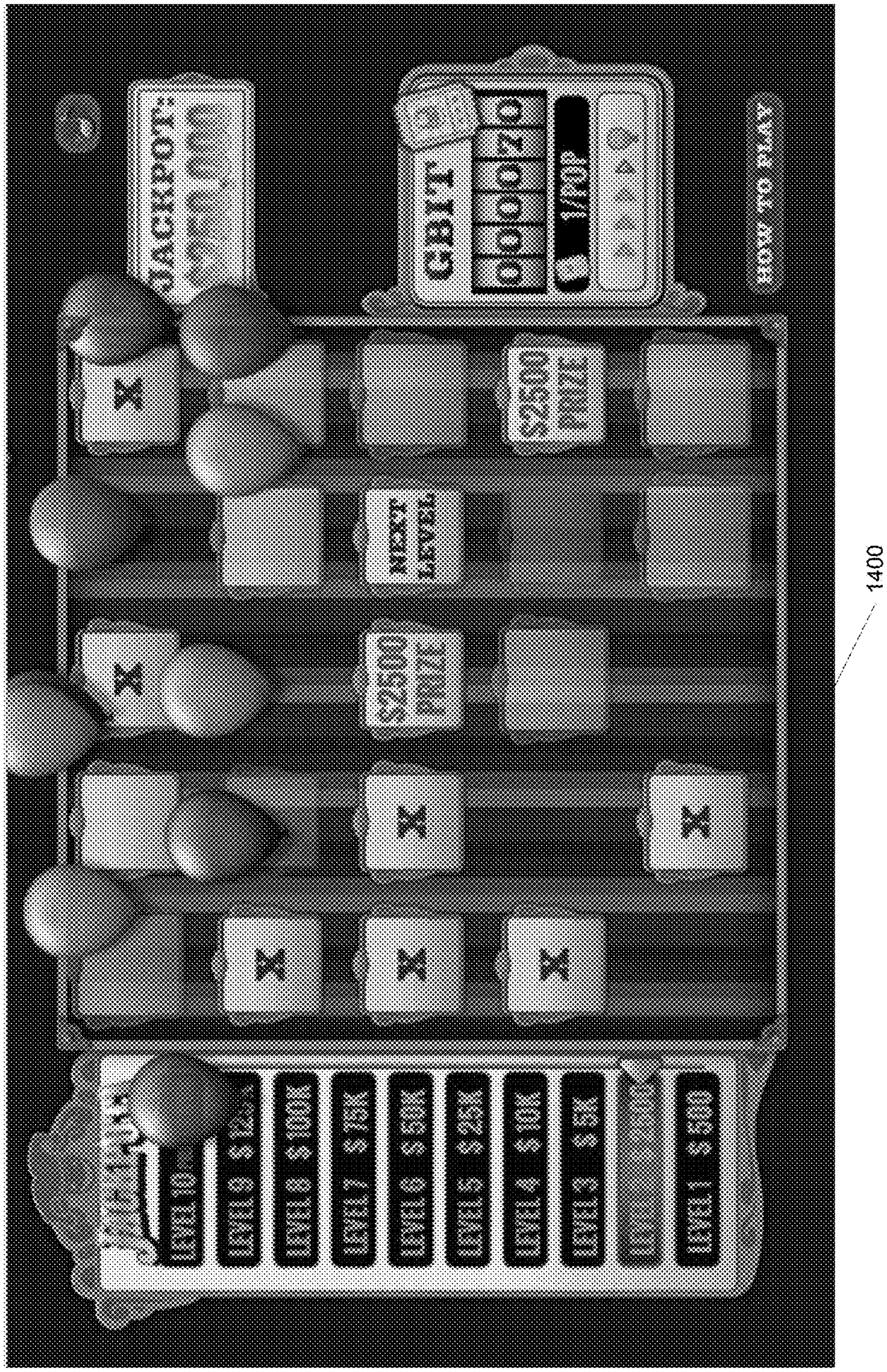

FIG. 9 is a process flow diagram of a process of to create a level-based wagering system providing multiple outcomes for each action in accordance with various embodiments of the invention. Specifically, the system generates a user interface having a graphical display of a plurality of actionable elements. The actionable elements are user selectable or pickable to indicate the user's choice from various options.

In many embodiments, the graphical display includes actionable elements that are differentiated by colors, sizes, or shapes. In some such embodiments, the actionable elements are in the form of balloons. Selecting or picking a balloon causes the balloon to "pop." The balloons are presented in a rectilinear grid. One such example embodiment is referred to hereinafter as "Cash Pop." FIGS. 10, 11, 12 and 13 illustrate a graphical displays of user interfaces 1100, 1200, 1300 and 1400 respectively, in accordance with an embodiment of the invention wherein the actionable elements are in the form of balloons organized in a rectilinear grid.

A user starts a session 1000 and an interactive application of an interactive controller generates 10001 a graphical display that is presented to the user in a user interface. The graphical display represents a level of level-based wagering system. Each level represents a state of a multilevel wagering proposition that is being presented to the user.

Referring again to FIG. 9, if the user successfully interacts with the graphical display by selecting an actionable element 1002, the interactive controller communicates to a process controller data of the actionable element that was selected. This information is then communicated to the wager controller by the process controller. The chance outcome affiliated with that selected actionable element is stored in a database 1005 accessible to a wagering subcontroller of the process controller.

Data of the chance outcome affiliated with the selected actionable element is communicated to the process controller by the wager subcontroller. The process controller communicates data of the chance outcome to the interactive controller and the chance outcome is then revealed 1004 to the user through the user interface by the interactive controller. If the chance outcome is an award of a prize, an amount of credits representing the prize are transferred to a credit meter of the user.

In some embodiments, upon selecting the actionable element (such as a balloon in an example embodiment), one of four chance outcomes may be revealed. Specifically:

Prize 1006 and 1008. The user wins a cash prize and the session is terminated as illustrated in the user interface 1300 of FIG. 12.

Free Selection or Pick 1010. The user gets another selection or pick on the same level from the remaining actionable elements.

Advance 1012 and 1014. The user advances to a next level as illustrated in user interface 1400 of FIG. 13.

Done 1016. The user wins nothing and the session is terminated as illustrated in the user interface 1200 of FIG. 11.

In an embodiment, each level has a set number of chance outcomes resulting in prizes being awarded that are available. These chance outcomes are available to any user who completes a selection or pick. When a prize is awarded to a user, the prize is removed from the potential chance outcomes and replaced in the graphical display of the user interface with a free selection or "Free Pick" chance outcome for subsequent users. That is, as users are awarded prizes from a level, subsequent users are provided with a free selection or pick in lieu of a prize if they make a selection or pick that should have resulted in an award of a prize.

Data for an example embodiment is illustrated in Table 1 entitled "Example Data 1." In the "Total Prize Money Data" table, several prizes having low to high values are illustrated. The total of all prizes in an amount of £10,000 with the values of the prizes including 1 prize of £4,000 (constituting 40% of the total prize money) herein termed "P1" for Prize 1. There are no prizes having a value of £500, herein termed "P2" for Prize 2, constituting 0% of the total prize value. There are also 4 prizes having a value of £250, herein termed "P3" for Prize 3, constituting 10% of the total prize money. There are 10 prizes having a value of £100, herein termed "P4" for Prize 4, constituting 10% of the total prize money. There are 20 prizes having a value of £50, herein termed "P5" for Prize 5, constituting 10% of the total prize money. There are also 600 prizes having a value of £5, herein termed "P6" for Prize 6, constituting 30% of the total prize amount. The prizes are distributed across a plurality of levels.

In an embodiment, there are 7 levels. In levels 1, 2, 3 and 5, there are 25 possible selections or picks. In level 4, there are 36 possible selections or picks. In level 6, there are 16 selections or picks. In level 7, there are 9 selections or picks. In level 1, there are 10 selections where the user is done, (that is, no longer allowed to make selections or picks), 10 selections or picks where the user advances to a next level, and 5 selections or picks where a user receives a free selection or pick. There are no prizes available for selection at level 1. At level 2, there are 16 selections that result in the user being done, 4 selections where the player advances to a next level, and 5 selections where the user receives a free selection or pick. In level 3, there are 18 selections or picks where the user is done, 2 selections or picks where the user advances to a next level, and 5 free selections or picks. In level 4, there are 26 selections or picks resulting in the user being done, 9 selections or picks where the user wins a low value prize (in this example embodiment the low value prize is Prize 6 or P6 as described herein) and 1 selection or pick where the user is given a free selection or pick. In level 5, there are 18 selections or picks where the user is done, 1 selection or pick resulting in the user receiving a P5 prize, 2 selections or picks where the user is awarded a P6 prize, 2 selections or picks where the user is advanced a level, and 2 selections or picks where the user is give 2 free selections or picks. At a level 6, there are 10 selections or picks where the user is done, 1 selection or pick resulting in an award of a P4 prize, 3 selections or picks resulting in the user being awarded a P6 prize, and 2 selections or picks where the user is advanced another level. In a final level 7, there are no selections or picks that will result in the user being done, that is, if the user makes it to level 7, they will be awarded a prize no matter which selection or pick they make. In level 7, there is one selection or pick resulting in the user being awarded a P1 prize, 2 selections or picks where the user is awarded a P3 prize, one selection or pick resulting in the user being awarded a P4 or a P5 prize, and 4 selections or picks where the user is awarded a P6 prize.

In many embodiments, the odds of being awarded a prize may change over time. In an example embodiment, in a long-term game that lasts for a month, as users complete sessions, the odds of being awarded a jackpot and other top prizes will get better. Based on the odds, it is unlikely that a user will win a jackpot, namely the P1 prize, early in the month, and much more likely that the user will win the jackpot later in the month. In order to do this, the initial layout of the levels is made such that is unlikely that a user will advance to the top level. During the month as users play the game and select or pick "Done" selections or picks, the "Done" selections or picks or will be replaced with "Advance" selections or picks to improve the odds of advancing to higher levels. A variable called OddsDecay-Rate specifies how many "Done" selections or picks on a level must be selected or picked before one of the "Done" selections or picks is replaced with an "Advance" selection or pick.

In some embodiments, as illustrated in the Example Data 1, for the first 1 to 50,000 plays of a level-based multiple outcome wagering system, the odds of a user being awarded a P1 prize is 1:2,980,800, a P3 prize is 1:1,490,400, a P4 prize is 1:541,964, a P5 prize is 1:80,562, and a P6 prize is 1:395. By the time the number of plays has reached 150,001 or more, the odds of a user being awarded a P3 prize are 1:25,234, the odds of being awarded a P4 prize is 1:10,094, the odds of being awarded a P5 prize is 1:4,976, and the odds of being awarded a P6 prize is 1:315.

In some embodiments, the cost in credits for each level differs, generally with higher levels costing more for a pick as well as granting higher awards. Table 2 entitled "Example Data 2" is data from another example embodiment of a level-based multiple outcome wagering system having a lower cost to play. The odds of winning a lower valued prize are much greater, but the total value of all prizes awarded is lower than the prizes awarded in accordance the Example Data 1.

In many embodiments, a primary hybrid game is played in which a user wagers credits during the play of a skill-based game. The user earns skill credits, termed Gbit® credits as illustrated in FIGS. 10, 11, 12 and 13, for skillful play and the skill credits are exchanged by the user to play the level-based multiple outcome wagering system as described herein.

TABLE 1

Example Data 1

| £10,000 | Total Prize Money Distribution | |
|---|---|---|
| **Percent** | **Prize** | **Quantity** |
| 40% | £4,000 | 1 |
| 0% | £500 | 0 |

TABLE 1-continued

Example Data 1

| Percent | Prize | Quantity |
|---|---|---|
| 10% | £250 | 4 |
| 10% | £100 | 10 |
| 10% | £50 | 20 |
| 30% | £5 | 600 |

7 Levels
Level Sizes

| Level | Picks | DONE | P1 | P2 | P3 | P4 | P5 | P6 | ADV | FP |
|---|---|---|---|---|---|---|---|---|---|---|
| 1 | 25 | 10 | 0 | 0 | 0 | 0 | 0 | 0 | 10 | 5 |
| 2 | 25 | 16 | 0 | 0 | 0 | 0 | 0 | 0 | 4 | 5 |
| 3 | 25 | 18 | 0 | 0 | 0 | 0 | 0 | 0 | 2 | 5 |
| 4 | 36 | 26 | 0 | 0 | 0 | 0 | 0 | 9 | 1 | 0 |
| 5 | 25 | 18 | 0 | 0 | 0 | 0 | 1 | 2 | 2 | 2 |
| 6 | 16 | 10 | 0 | 0 | 0 | 1 | 0 | 3 | 2 | 0 |
| 7 | 9 | 0 | 1 | 0 | 2 | 1 | 1 | 4 | 0 | 0 |

50 OddsDecayRate
Odds of winning

| | Prize | | | | | |
|---|---|---|---|---|---|---|
| Play | £4,000 | £500 | £250 | £100 | £50 | £5 |
| 1 | 2,980,800 | 0 | 1,490,400 | 541,964 | 80,562 | 395 |
| 50,001 | 0 | 0 | 189,257 | 75,703 | 11,470 | 369 |
| 100,001 | 0 | 0 | 55,200 | 22,080 | 6,494 | 341 |
| 150,001 | 0 | 0 | 25,234 | 10,094 | 4,976 | 315 |
| end | 0 | 0 | 0 | 0 | 0 | 270 |

TABLE 2

Example Data 2

| £5,000 | Total Prize Money Distribution | |
|---|---|---|
| **Percent** | **Prize** | **Quantity** |
| 40% | £2,000 | 1 |
| 0% | £500 | 0 |
| 0% | £250 | 0 |
| 20% | £100 | 10 |
| 0% | £50 | 0 |
| 40% | £5 | 400 |

6 Levels
Level Sizes

| Level | Picks | DONE | P1 | P2 | P3 | P4 | P5 | P6 | ADV | FP |
|---|---|---|---|---|---|---|---|---|---|---|
| 1 | 25 | 10 | 0 | 0 | 0 | 0 | 0 | 0 | 10 | 5 |
| 2 | 25 | 16 | 0 | 0 | 0 | 0 | 0 | 0 | 4 | 5 |
| 3 | 25 | 16 | 0 | 0 | 0 | 0 | 0 | 0 | 4 | 5 |
| 4 | 25 | 12 | 0 | 0 | 0 | 0 | 0 | 12 | 1 | 0 |
| 5 | 16 | 9 | 0 | 0 | 0 | 1 | 0 | 5 | 1 | 0 |
| 6 | 9 | 0 | 1 | 0 | 0 | 2 | 0 | 6 | 0 | 0 |

25 OddsDecayRate
Odds of winning

| 0 | Prize | | | | | |
|---|---|---|---|---|---|---|
| Play | £2,000 | £500 | £250 | £100 | £50 | £5 |
| 1 | 180,000 | 0 | 0 | 16,364 | 0 | 101 |
| 10,001 | 45,000 | 0 | 0 | 4,091 | 0 | 93 |
| 20,001 | 12,857 | 0 | 0 | 1,978 | 0 | 85 |
| End | 0 | 0 | 0 | 0 | 0 | 74 |
| 0 | 0 | 0 | 0 | 0 | 0 | 0 |

While the above description may include many specific embodiments of the invention, these should not be construed as limitations on the scope of the invention, but rather as examples of embodiments thereof. It is therefore to be understood that the invention can be practiced otherwise than specifically described, without departing from the scope and spirit of the invention. Thus, embodiments of the invention described herein should be considered in all respects as illustrative and not restrictive.

What is claimed:

1. A level-based multiple outcome wagering system, comprising:

an interactive controller constructed to:

control a multilevel wagering session;

generate a graphical display of a plurality of actionable elements, wherein the graphical display is a representation of a level of a multilevel wagering proposition presented to a user during the multilevel wagering session;

display the graphical display to a user;

receive the user's selection of a selected actionable element selected from the plurality of actionable elements;

communicate data of the selected actionable element to a process controller; and receive, from the process controller, a selection result; and generate an updated graphical display including a change in the plurality of actionable elements and the selection result triggered by the user's selection of the selected actionable element; and the process controller constructed to communicate with the interactive controller and a level-based multiple outcome controller, wherein the process controller is constructed to:

determine from the data of the selected actionable element, a chance outcome;

distribute the chance outcome to the level-based multiple outcome controller;

receive, from the level-based multiple outcome controller, a selection result associated with the chance outcome; and distribute the selection result to the interactive controller; and the level-based multiple outcome controller constructed to:

receive the chance outcome;

determine the selection result associated the with the chance outcome from a group including a prize, an advancement to a next level of the multilevel wagering proposition, and a termination of the multilevel wagering session;

when the selection result is the prize, determine the availability of the prize from a pool of pre-determined random results;

when the prize is not available, replace the prize with a free pick, and distribute the selection result to the process controller.

2. The level-based multiple outcome wagering system of claim 1, wherein the interactive controller and the process controller are constructed from the same device.

3. The level-based multiple outcome wagering system of claim 1, wherein the process controller is operatively connected to the interactive controller using a communication link.

4. The level-based multiple outcome wagering system of claim 1, further comprising:

an enclosure constructed to mount:

a user input device operatively connected to the interactive controller;

a user output device operatively connected to the interactive controller;

a credit input device operatively connected to the process controller; and a credit output device operatively connected to the process controller.

5. The level-based multiple outcome wagering system of claim 4, further comprising a random number generator, wherein the process controller is further constructed to:

communicate with the credit input device to receive a credit input, the credit input for wagering in the multilevel wagering proposition;

generate a chance-based component of the multilevel wagering proposition based on a random result generated by the random number generator;

determine the multilevel wagering proposition based on the chance-based component;

communicate the multilevel wagering proposition to the interactive controller; and update a credit meter based on a determination from the data of the selected actionable element to award to the user of a chance outcome that is a prize.

* * * * *